(12) United States Patent
Kim et al.

(10) Patent No.: US 11,604,544 B2
(45) Date of Patent: Mar. 14, 2023

(54) TOUCH SENSOR AND DISPLAY DEVICE

(71) Applicant: SAMSUNG DISPLAY CO. LTD., Yongin-si (KR)

(72) Inventors: Ki Cheol Kim, Yongin-si (KR); Hwan Hee Jeong, Cheonan-si (KR); Mi Kyung Seo, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 349 days.

(21) Appl. No.: 16/166,744

(22) Filed: Oct. 22, 2018

(65) Prior Publication Data
US 2019/0377438 A1 Dec. 12, 2019

(30) Foreign Application Priority Data
Jun. 8, 2018 (KR) .......................... 10-2018-0066059

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0448* (2019.05); *G06F 3/0446* (2019.05); *G06F 2203/04111* (2013.01)

(58) Field of Classification Search
CPC .......... G06F 3/044; G06F 3/047; G06F 3/041; G06F 3/0412; G06F 2203/04111; G06F 3/0443; G06F 3/0446; G06F 3/0448; H01L 27/323
See application file for complete search history.

(56) References Cited

U.S. PATENT DOCUMENTS

| 10,452,181 | B2 | 10/2019 | Hanari | |
|---|---|---|---|---|
| 2010/0085326 | A1* | 4/2010 | Anno | G06F 3/044 345/174 |
| 2013/0299222 | A1* | 11/2013 | Lee | G06F 3/0445 174/258 |
| 2014/0320765 | A1* | 10/2014 | Jiang | G06F 3/044 349/12 |

(Continued)

FOREIGN PATENT DOCUMENTS

| CN | 203689474 | 7/2014 |
|---|---|---|
| CN | 104123023 | 10/2014 |

(Continued)

*Primary Examiner* — Julie Ann Watko
(74) *Attorney, Agent, or Firm* — F. Chau & Associates, LLC

(57) ABSTRACT

A touch sensor includes a first area and a second area; first electrode units comprising a plurality of first touch electrodes arranged in a first direction and electrically connected to one another and located in the first area; second electrode units comprising a plurality of second touch electrodes arranged in a second direction and electrically connected to one another and located in the first area; and a first electrode pattern comprising a first portion located in the first area and electrically connected to one of the first electrode units that is adjacent thereto, and a second portion extended from the first portion to the second area, wherein a width of the first electrode pattern in the first direction is less than a width of the first touch electrodes in the first direction and is greater than half the width of the first touch electrodes.

21 Claims, 24 Drawing Sheets

(56) References Cited

U.S. PATENT DOCUMENTS

| | | | |
|---|---|---|---|
| 2015/0001060 A1 | 1/2015 | Kim et al. | |
| 2015/0338977 A1* | 11/2015 | Matsumoto | G06F 3/047 345/174 |
| 2015/0346865 A1 | 12/2015 | Hong et al. | |
| 2016/0117031 A1* | 4/2016 | Han | G06F 3/0443 345/174 |
| 2016/0306479 A1* | 10/2016 | Zhu | G06F 3/044 |
| 2016/0315284 A1* | 10/2016 | Jeon | H01L 51/5256 |
| 2017/0293381 A1* | 10/2017 | Lee | G06F 3/0443 |
| 2017/0338287 A1* | 11/2017 | Ito | H01L 27/3225 |
| 2017/0344165 A1* | 11/2017 | Heo | H01L 27/323 |
| 2017/0364179 A1* | 12/2017 | Jung | G06F 3/0412 |
| 2018/0015792 A1 | 1/2018 | Graf et al. | |
| 2018/0061898 A1 | 3/2018 | Oh et al. | |
| 2018/0067599 A1* | 3/2018 | Cai | G06F 3/0412 |
| 2018/0095584 A1* | 4/2018 | Lee | H01L 51/5203 |
| 2018/0097041 A1 | 4/2018 | Ito | |
| 2018/0269262 A1 | 9/2018 | Ito | |
| 2018/0284922 A1* | 10/2018 | Teranishi | G06F 3/0443 |
| 2019/0004626 A1* | 1/2019 | Ko | G06F 3/0448 |
| 2019/0018531 A1 | 1/2019 | Zhu et al. | |
| 2019/0042038 A1* | 2/2019 | Lee | G06F 3/04164 |
| 2019/0051708 A1* | 2/2019 | Jeong | H01L 51/5281 |
| 2019/0245012 A1 | 8/2019 | Ito | |
| 2020/0167040 A1* | 5/2020 | Shepelev | G06F 3/047 |

FOREIGN PATENT DOCUMENTS

| | | | | |
|---|---|---|---|---|
| CN | 107402662 | | 5/2020 | |
| JP | 2018063669 | | 4/2018 | |
| KR | 20100133474 A | * | 12/2010 | G03F 7/7025 |
| KR | 10-1096559 | | 12/2011 | |
| KR | 10-2012-0133474 A | * | 12/2012 | |
| KR | 20120133474 A | * | 12/2012 | G06F 3/041 |
| KR | 10-1373044 | | 3/2014 | |
| KR | 10-2015-0001016 | | 1/2015 | |
| KR | 10-2016-0048534 | | 5/2016 | |
| TW | 201333794 | | 8/2013 | |
| TW | 201813077 A | * | 4/2018 | G06F 3/0412 |

* cited by examiner

TOUCH SENSOR AND DISPLAY DEVICE

CROSS-REFERENCE TO RELATED APPLICATION

This application claims priority under 35 U.S.C. 119 to Korean Patent Application No. 10-2018-0066059, filed on Jun. 8, 2018, in the Korean Intellectual Property Office, the disclosure of which is incorporated by reference in its entirety herein.

BACKGROUND

1. Technical Field

The present disclosure relates to a touch sensor and a display device.

2. Discussion of Related Art

Electronic devices that provide images to a user such as a smart phone, a tablet personal computer (PC), a digital camera, a laptop computer, a navigation device and a smart television (TV) include a display device for displaying images. Such a display device includes a display panel for generating and displaying an image and various input devices.

A touchscreen including a touch sensor that recognizes an input touch has been widely employed for display devices of smartphones and tablets. The touchscreen enables a user to interact directly with displayed objects, rather than use a mouse or a keypad.

SUMMARY

At least one embodiment of the present inventive concept provides a touch sensor and a display device with improved touch sensitivity.

An exemplary embodiment of the inventive concept provides a touch sensor including a base layer comprising a sensing area and a peripheral area around the sensing area, the sensing area comprising a first area and a second area located on an outer side of the first area in a first direction; first electrode units comprising a plurality of first touch electrodes arranged on the base layer in the first direction and electrically connected to one another in the first direction, wherein the first electrode units are arranged in a second direction intersecting the first direction and spaced apart from one another in the second direction, and are located in the first area; second electrode units comprising a plurality of second touch electrodes arranged on the base layer in the second direction and electrically connected to one another in the second direction, wherein the second electrode units are arranged in the first direction and spaced apart from one another in the first direction, and are located in the first area; and a first electrode pattern disposed on the base layer, wherein the first electrode pattern comprises a first portion located in the first area and electrically connected to one of the first electrode units that is adjacent thereto in the first direction, and a second portion extended from the first portion to the second area, wherein a width of the first electrode pattern in the first direction is less than a width of the first touch electrodes measured in the first direction and is greater than half the width of the first touch electrodes.

An exemplary embodiment of the inventive concept provides a touch sensor including a base layer comprising a sensing area and a peripheral area around the sensing area, the sensing area comprising a first area and a second area located on an outer side of the first area in a first direction; first electrode units comprising a plurality of first touch electrodes arranged on the base layer in the first direction and electrically connected to one another in the first direction, wherein the first electrode units are arranged in a second direction intersecting the first direction and spaced apart from one another in the second direction, and are located in the first area; second electrode units comprising a plurality of second touch electrodes arranged on the base layer in the second direction and electrically connected to one another in the second direction, wherein the second electrode units are arranged in the first direction and spaced apart from one another in the first direction, and are located in the first area; and a first conductive pattern disposed on the base layer in the second area, where the first conductive pattern is connected to one of the second electrode units that is adjacent thereto in the first direction.

An exemplary embodiment of the inventive concept provides a display device including a base substrate comprising a display area; a self-luminous element disposed on the base substrate in the display area; an thin-film encapsulation layer disposed on the self-luminous element and comprising a sensing area overlapping with the display area, the sensing area comprising a first area and a second area located on the outer side of the first area in the first direction; first electrode units comprising first touch electrodes arranged on the thin-film encapsulation layer in the first direction and electrically connected to one another in the first direction, the first electrode units being arranged in a second direction intersecting the first direction in the first area and spaced apart from one another in the second direction; second electrode units comprising second touch electrodes arranged on the thin-film encapsulation layer in the second direction and electrically connected to one another in the second direction, the second electrode units being arranged in the first direction in the first area and spaced apart from one another in the first direction; and a first electrode pattern located on the thin-film encapsulation layer and comprising a first portion electrically connected to one of the first electrode units that is adjacent thereto in the first direction, and a second portion extended from the first portion to the second area, wherein a width of the first electrode pattern in the first direction is less than a width of the first touch electrodes in the first direction and is greater than half the width of the first touch electrodes.

DETAILED DESCRIPTION OF THE EXEMPLARY EMBODIMENTS

Figure 1:
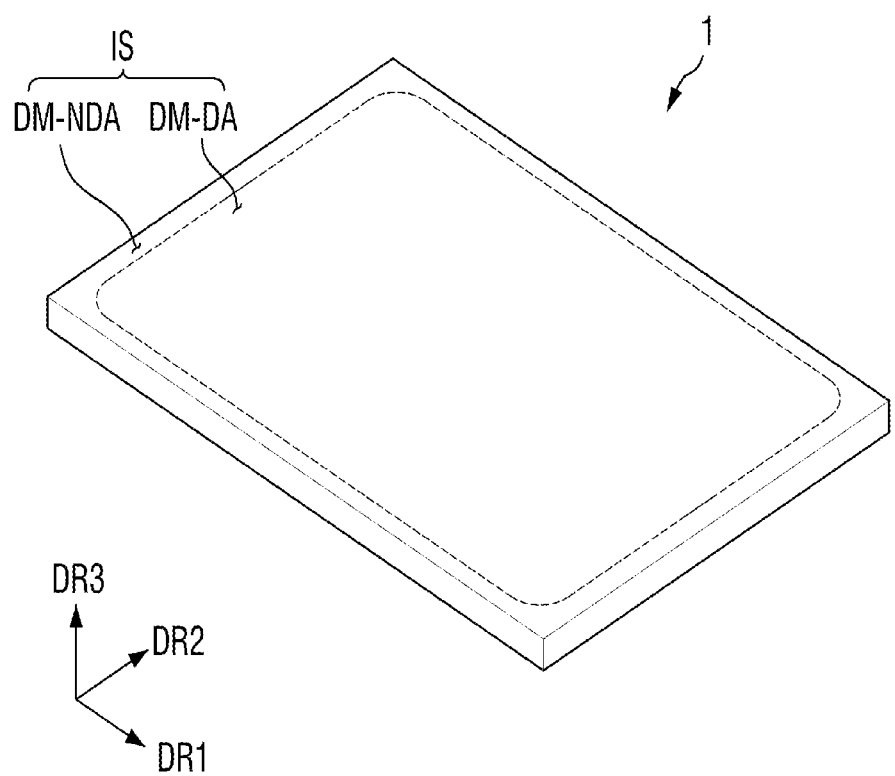
FIG. 1 is a perspective view of a display device according to an exemplary embodiment of the present inventive concept.

Features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art. Like reference numerals refer to like elements throughout the specification.

As used herein, the singular forms "a", "an" and "the" are intended to include the plural forms as well, unless the context clearly indicates otherwise.

It will be understood that when an element or layer is referred to as being "on", "connected to" or "coupled to" another element or layer, it can be directly on, connected or coupled to the other element or layer or intervening elements or layers may be present.

The present invention will be described with reference to perspective views, cross-sectional views, and/or plan views, in which exemplary embodiments of the invention are shown. Thus, the profile of an exemplary view may be modified according to manufacturing techniques and/or allowances. That is, the embodiments of the invention are not intended to limit the scope of the present invention but cover all changes and modifications that can be caused due to a change in manufacturing process.

Hereinafter, exemplary embodiments of the present inventive concept will be described with reference to the accompanying drawings.

Figure 2:
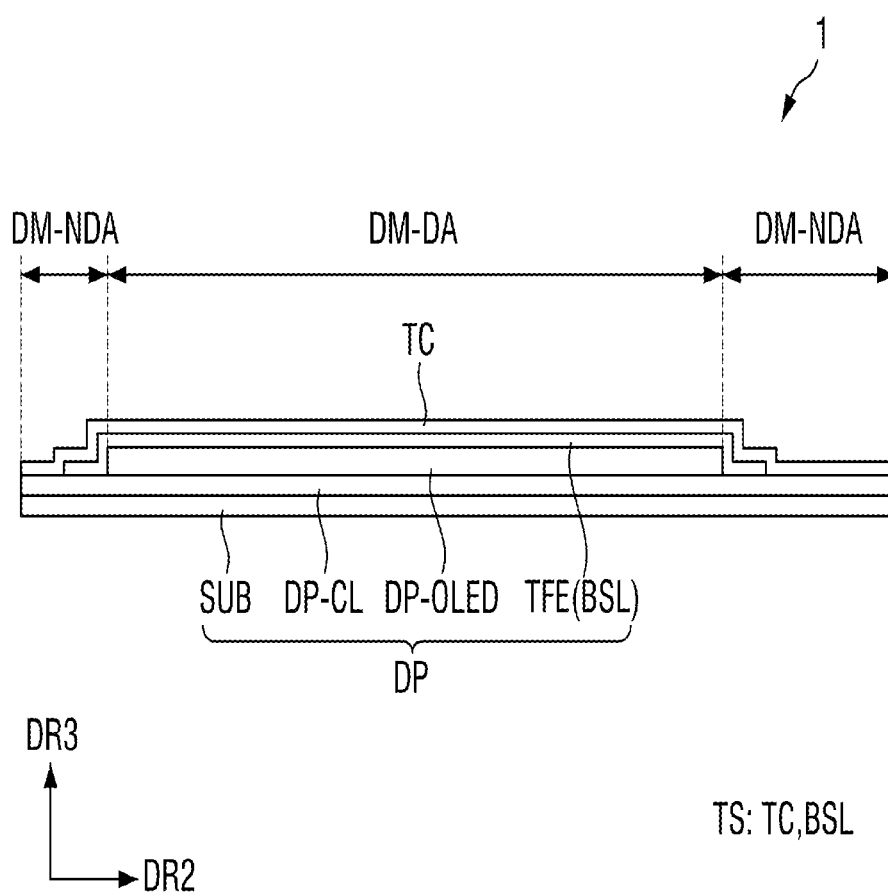
FIG. 2 is a cross-sectional view of the display device shown in FIG. 1.

FIG. 1 is a perspective view of a display device according to an exemplary embodiment of the present inventive concept. FIG. 2 is a cross-sectional view of the display device shown in FIG. 1.

Referring to FIGS. 1 and 2, a display device 1 includes an image surface IS on which an image is displayed. The image surface IS may be parallel to the plane defined by a first direction DR1 and a second direction DR2. The normal direction of the image surface IS, i.e., the thickness direction of the display device 1 is indicated by a third direction DR3. The front surface (or the upper surface) and the back surface (or lower surface) of each of the elements are defined in the third direction DR3. It is, however, to be noted that the directions indicated by the first to third directions DR1, DR2 and DR3 are relative concepts and may be converted into different directions.

For example, although FIG. 1 shows the display device 1 having the image surface IS having a flat shape, this is merely illustrative. For example, the display device 1 may include a curved image surface or a stereoscopic image surface (a polygonal columnar image surface) including a plurality of display areas each facing different directions.

In some exemplary embodiments, the display device 1 may be a rigid display device or a flexible display device. FIG. 1 shows a portable terminal as an example of applications employing the display device 1 according to an exemplary embodiment of the present inventive concept. The portable terminal may include a tablet PC, a smart phone, a personal digital assistant (PDA), a portable multimedia player (PMP), a game device, or a wristwatch type electronic device. It is, however, to be understood that the type of the display device 1 is not limited to those listed above. For example, according to other exemplary embodiments of the present disclosure, the display device 1 may be used in a large electronic device such as a television or an electric board, small and medium electronic device such as a personal computer, a laptop computer, a vehicle navigation device, a smart watch, and a camera.

In an exemplary embodiment, the display device 1 has a rectangular shape when viewed from the top. The display device 1 may include two shorter sides extending in the first direction DR1, and two longer sides extending in the second direction DR2. Although the corners where the longer sides and the shorter sides of the display device 1 meet may form a right angle, this is merely illustrative. For example, the display device 1 may instead have rounded corners. Alternatively, the corners of the display device 1 may be chamfered to reduce the risk of breakage. However, the shape of the display device 1 when viewed from the top is not limited to that shown in the drawings. For example, the display device 1 may have a circular shape or other shapes.

The image surface IS of the display device 1 includes a display area DM-DA where an image is displayed, and a non-display area DM-NDA adjacent to the display area DM-DA. The non-display area DM-NDA is an area where no image is displayed.

In an exemplary embodiment, the display area DM-DA has a rectangular shape. In some exemplary embodiments, the corners of the display area DM-DA form curved surfaces as shown in FIG. 1. It is, however, to be understood that the present disclosure is not limited thereto. In the following description, an example where the corners of the display area DM-DA form curved surfaces will be described.

The non-display area DM-NDA may surround the display area DM-DA. It is, however, to be understood that the present disclosure is not limited thereto. The shape of the display area DM-DA and the shape of the non-display area DM-NDA may be designed relatively.

As used herein, unless stated otherwise, the terms "on," "upper side," "above," "top" and "upper surface" refer to the side indicated by the arrow of the third direction DR3 intersecting the first direction DR1 and the second direction DR2 as shown in the drawings. The terms "under," "lower side," "below," "bottom" and "lower surface" refer to the opposite side indicated by the arrow of the third direction DR3 as shown in the drawings.

FIG. 2 is a cross-sectional view of the display device 1 according to an exemplary embodiment of the present inventive concept. FIG. 2 shows a cross section defined by the second direction DR2 and the third direction DR3.

As shown in FIG. 2, the display device 1 includes a display panel DP and a touch sensor TS. The display panel DP generates an image, and the touch sensor TS acquires coordinate information of an input from the outside (a touch event). Although not shown in the drawings, the display device 1 may further include a protection member disposed below the display panel DP, an anti-reflection member and/or a window member disposed above the touch sensor TS.

In an exemplary embodiment, the display panel DP includes a self-luminous element. In an exemplary embodiment, the self-luminous element includes at least one of an organic light-emitting diode, a quantum dot light-emitting diode, and an inorganic-based micro light-emitting diode (e.g., Micro LED), an inorganic-based nano light-emitting diode (e.g., Nano LED). In the following description, an example where the self-luminous element is an organic light-emitting diode will be described for convenience of illustration.

The display panel DP includes a base substrate SUB, a circuit element layer DP-CL, a display element layer DP-OLED and a thin-film encapsulation layer TFE sequentially disposed on the base substrate SUB. Although not shown in the drawings, the display panel DP may further include functional layers such as an anti-reflection layer and a refractive index control layer.

In some exemplary embodiments, the base substrate SUB may be made of an insulating material such as glass, quartz or polymer resin. Examples of the polymer material may include polyethersulphone (PES), polyacrylate (PA), polyacrylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP) or a combination thereof. The base substrate SUB may include a metallic material.

The base substrate SUB may be a rigid substrate or a flexible substrate that can be bent, folded, or rolled. An example of the material of the flexible substrate is, but is not limited to, polyimide (PI).

The display area DM-DA and the non-display area DM-NDA described above with reference to FIG. 1 may also be defined on the base substrate SUB.

In an embodiment, the circuit element layer DP-CL includes at least one intermediate insulating layer and a circuit element. In an embodiment, the intermediate insulating layer includes at least one intermediate inorganic layer and at least one intermediate organic layer. The circuit element may include signal lines and a driving circuit of a pixel. The circuit element layer DP-CL may be formed via a process of forming an insulating layer by coating, deposition or the like and a process of patterning a conductor layer and/or a semiconductor layer by photolithography.

In an embodiment, the display element layer DP-OLED includes a self-luminous element. For example, the self-luminous element may be an organic light-emitting diode. The display element layer DP-OLED may further include an organic layer such as a pixel defining layer.

The thin-film encapsulation layer TFE seals the display element layer DP-OLED. The thin-film encapsulation layer TFE includes at least one inorganic layer (hereinafter referred to as encapsulation inorganic layer). The thin-film encapsulation layer TFE may further include at least one organic layer (hereinafter referred to as an encapsulation organic layer). The encapsulation inorganic layer protects the display element layer DP-OLED from moisture/oxygen, and the encapsulation organic layer protects the display element layer DP-OLED from foreign substances such as dust particles. The encapsulation inorganic layer may include a silicon nitride layer, a silicon oxynitride layer, a silicon oxide layer, a titanium oxide layer, or an aluminum oxide layer. The encapsulation organic layer may include, but is not limited to, an acrylic organic layer.

In some exemplary embodiments, the thin-film encapsulation layer (TFE) may be replaced by an encapsulating substrate. The encapsulating substrate seals the display element layer DP-OLED with a sealant.

The touch sensor TS may include a base layer BSL and a touch element layer TC disposed on the base layer BSL. In some exemplary embodiments, the base layer BSL is a part of the display panel DP. In some exemplary embodiments, the base layer BSL includes the thin-film encapsulation layer TFE. However, some of the elements of the display panel DP may be further used as the base layer BSL of the touch sensor TS.

The thickness of the display device 1 can be reduced when some of the elements of the display panel DP, e.g., the thin-film encapsulation layer TFE is used as the base layer BSL of the touch sensor TS. It is, however, to be understood that the present disclosure is not limited thereto. The base layer BSL of the touch sensor TS may be implemented as an element separated from the display panel DP and may be coupled to the display panel DP via an adhesive layer. Hereinafter, an example where the base layer BSL of the touch sensor TS includes some of the elements of the display panel DP, e.g., a thin-film encapsulation layer TFE will be described.

The touch sensor TS may be used to sense an input from the outside by, for example, capacitive sensing. The capacitive sensing can obtain coordinate information of a touched point by a self-capacitance manner or a mutual-capacitance manner. In the following description, an example where the touch sensor TS has a mutual capacitance type structure will be described for convenience of illustration. It is, however, to be understood that the present disclosure is not limited thereto.

Figure 3:
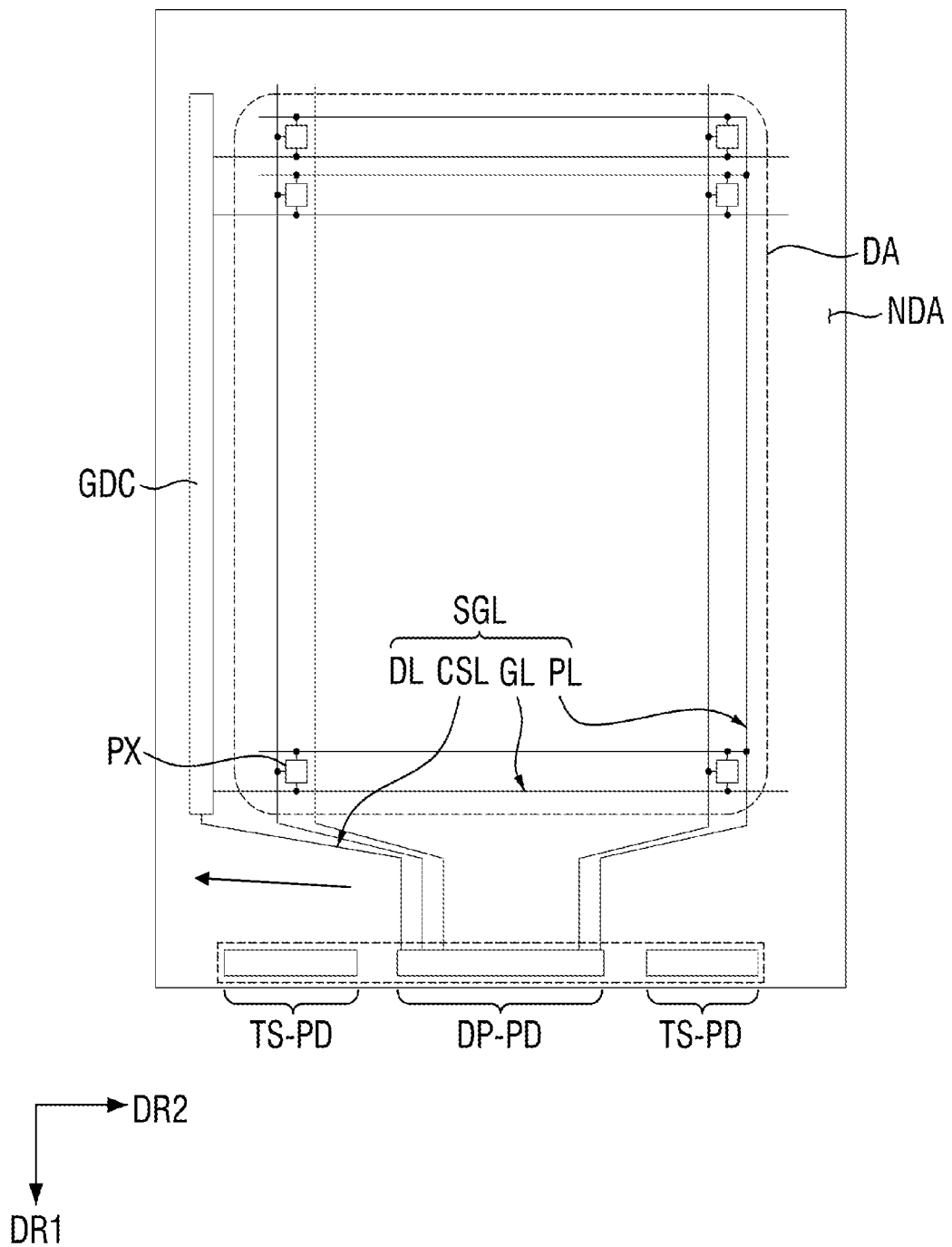
FIG. 3 is a plan view of a display panel included in a display device according to an exemplary embodiment of the present inventive concept.
Figure 4:
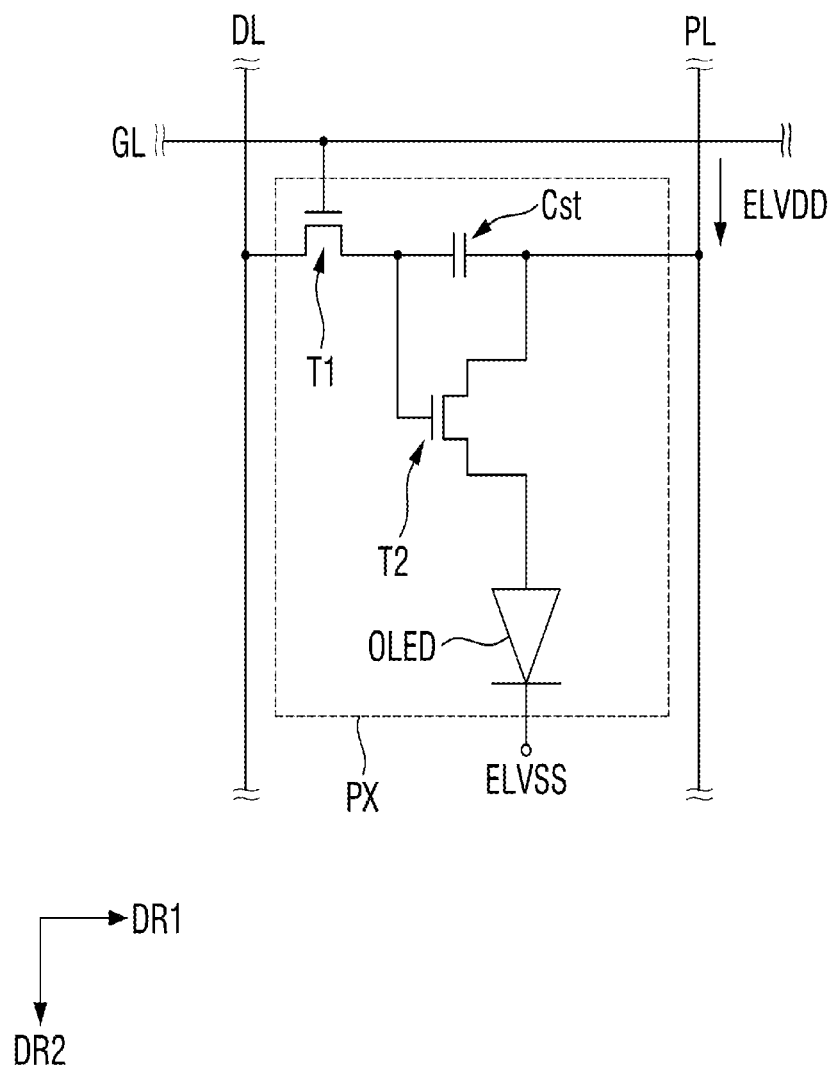
FIG. 4 is an exemplary equivalent circuit diagram of the pixel shown in FIG. 3.
Figure 5:
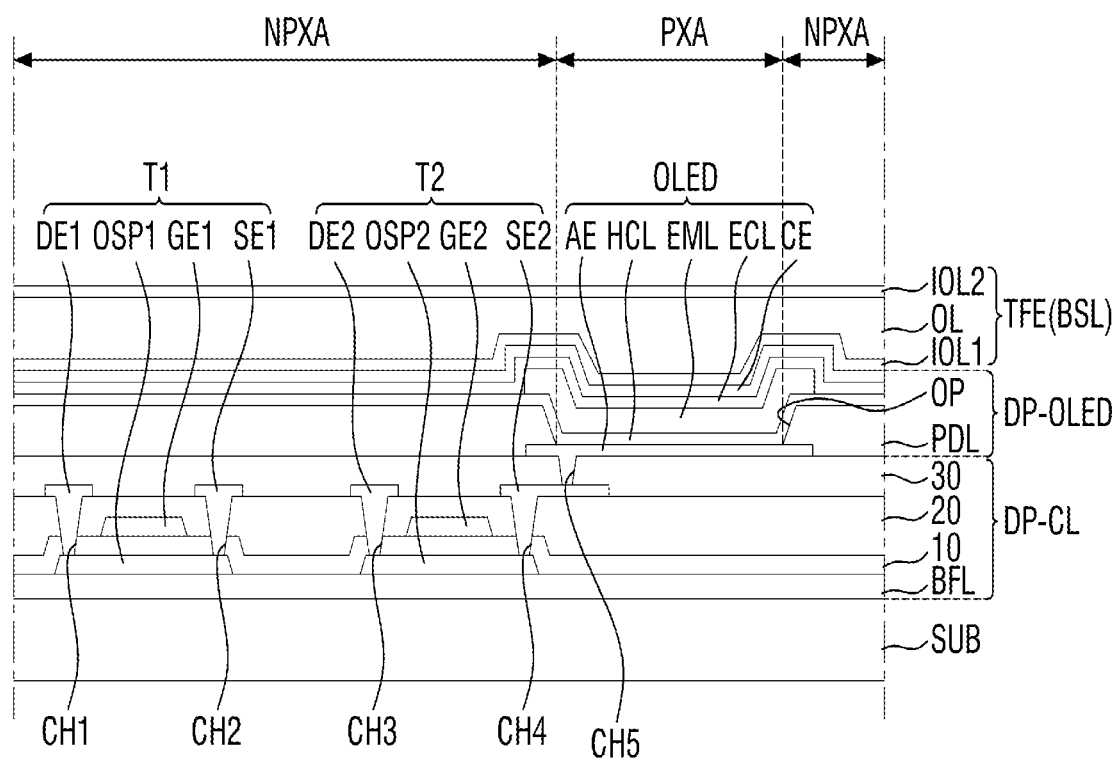
FIG. 5 is a schematic cross-sectional view of the pixel shown in FIG. 4.

FIG. 3 is a plan view of a display panel included in a display device according to an exemplary embodiment of the present inventive concept. FIG. 4 is an exemplary equivalent circuit diagram of the pixel shown in FIG. 3. FIG. 5 is a schematic cross-sectional view of the pixel shown in FIG. 4.

Referring to FIGS. 3 to 5, the display panel DP includes a display area DA and a non-display area NDA on a plane. In this exemplary embodiment, the non-display area NDA may be defined around the display area DA. The display area DA and the non-display area NDA of the display panel DP may correspond to the display area DM-DA and the non-display area DM-NDA of the display device 1 shown in FIG. 1, respectively. The display area DA and the non-display area NDA of the display panel DP are not necessarily identical to the display area DM-DA and the non-display area DM-NDA of the display device 1, respectively, but may be altered depending on the structure/design of the display panel DP. In some exemplary embodiments, the corners of the display area DA of the display panel DP may have a curved shape.

In an embodiment, the display panel DP includes a driver circuit GDC, a plurality of signal lines SGL, and a plurality of pixels PX. The plurality of pixels PX is disposed in the display area DA. In an embodiment, each of the pixels PX includes a self-luminous element (e.g., an organic light-emitting diode) and a pixel driving circuit connected to the self-luminous element. The driver circuit GDC, the signal lines SGL and the pixel driver circuit may be included in the circuit element layer DP-CL shown in FIG. 2.

In an embodiment, the driver circuit GDC includes a scan driving circuit. The driver circuit GDC generates scan signals and sequentially outputs the scan signals to scan lines GL to be described later. The scan driving circuit may further output another control signal to the pixel driving circuits of the pixels PX.

The driver circuit GDC may include a plurality of thin-film transistors formed via the same process as the pixel driving circuit of the pixels PX, for example, a low temperature polycrystalline silicon (LTPS) process or a low temperature polycrystalline oxide (LTPO) process.

In an embodiment, the signal lines SGL include scan lines GL, data lines DL, a power supply line PL, and a control signal line CSL. The scan lines GL are connected to the respective pixels PX, and the data lines DL are connected to the respective pixels PX. The power supply line PL is connected to the pixels PX. In an embodiment, the control signal line CSL provides control signals to the driver circuit GDC.

The display panel DP includes signal pads DP-PD connected to the ends of the signal lines SGL. Each of the signal pads DP-PD may be a circuit element. A portion of the non-display area NDA where the signal pads DP-PD are disposed may be defined as a pad area.

In the pad area of the non-display region NDA, touch pads TS-PD electrically connected to signal lines 901, 903, and 905 of the touch sensor TS to be described later are further disposed. In an exemplary embodiment, the touch pads TS-PD are formed via the same process as the signal lines SGL and may be disposed on the same layer as the signal lines SGL.

In an exemplary embodiment, the touch pads TS-PD are electrically insulated from the signal lines SGL of the display panel.

Although not shown in the drawings, a chip mounting area may be further defined in the non-display area NDA of the display panel DP. A driving chip such as a timing control circuit in the form of chip may be mounted in the chip mounting area.

FIG. 4 shows one of the scan lines GL, one of the data lines DL, the power supply line PL, and a pixel PX connected thereto. It is to be understood that the configuration of the pixel PX is not limited to that shown in FIG. 5 but may be modified.

The pixel PX includes a first transistor T1 (or a switching transistor), a second transistor T2 (or a driving transistor), an organic light-emitting diode (OLED), and a capacitor Cst as a pixel driving circuit for driving the organic light-emitting diode OLED. The organic light-emitting diode OLED may be a top-emission organic light-emitting diode or a bottom-emission organic light-emitting diode. The power supply line PL provides a first supply voltage ELVDD to the second transistor T2. A second supply voltage ELVSS is supplied to the organic light-emitting diode OLED. In an embodiment, the second supply voltage ELVSS has a voltage level lower than that of the first supply voltage ELVDD.

The first transistor T1 outputs a data signal applied to the data line DL in response to a scan signal applied to the scan line GL. The capacitor Cst is charged with the voltage corresponding to the data signal received from the first transistor T1. The second transistor T2 is connected to the organic light-emitting diode OLED. The second transistor T2 controls the driving current flowing in the organic light-emitting diode OLED in response to the amount of charges stored in the capacitor Cst.

The pixel PX may include a plurality of transistors in addition to the first and second transistors T1 and T2, and may include capacitors in addition to capacitor Cst. The organic light-emitting diode OLED may be connected between the power supply line PL and the second transistor T2.

FIG. 5 shows a cross-sectional view of a part of the display panel DP corresponding to the equivalent circuit shown in FIG. 4.

The circuit element layer DP-CL, the display element layer DP-OLED, and the thin-film encapsulation layer TFE are disposed on the base layer BSL (e.g., substrate SUB) in this order. According to an exemplary embodiment, the circuit element layer DP-CL includes a buffer layer BFL as an inorganic layer, a first intermediate inorganic layer 10, a second intermediate inorganic layer 20, and an intermediate organic layer 30 as an organic layer. According to an exemplary embodiment of the present inventive concept, the buffer layer BFL is an optional element and thus may be eliminated.

A semiconductor pattern OSP1 of the first transistor T1 (hereinafter referred to as a first semiconductor pattern) and a semiconductor pattern OSP2 of the second transistor T2 (hereinafter referred to as a second semiconductor pattern) are disposed on the buffer layer BFL. The first semiconductor pattern OSP1 and the second semiconductor pattern OSP2 may be selected from the group consisting of amorphous silicon, polysilicon, and a metal oxide semiconductor.

The first intermediate inorganic layer 10 is disposed on the first semiconductor pattern OSP1 and the second semiconductor pattern OSP2. A control electrode GE1 of the first transistor T1 (hereinafter referred to as a first control electrode) and a control electrode GE2 of the second transistor T2 (hereinafter referred to as a second control electrode) are disposed on the first intermediate inorganic layer 10. The first control electrode GE1 and the second control electrode GE2 may be produced via the same photolithography process as the scan lines GL (see FIG. 3).

The second intermediate inorganic layer 20 covering the first control electrode GE1 and the second control electrode GE2 is disposed on the first intermediate inorganic layer 10. An input electrode DE1 (hereinafter referred to as a first input electrode) and an output electrode SE1 (hereinafter referred to as a first output electrode) of the first transistor T1, and an input electrode DE2 (hereinafter referred to as a second input electrode) and an output electrode SE2 (hereinafter referred to as a second output electrode) of the second transistor T2 are disposed on the second intermediate inorganic layer 20.

The first input electrode DE1 and the first output electrode SE1 are connected to the first semiconductor pattern OSP1 via a first through-hole CH1 and a second through-hole CH2 passing through the first intermediate inorganic layer 10 and the second intermediate inorganic layer 20. The second input electrode DE2 and the second output electrode SE2 are connected to the second semiconductor pattern OSP2 via a third through-hole CH3 and a fourth through-hole CH4 passing through the first intermediate inorganic layer 10 and the second intermediate inorganic layer 20. It is to be noted that, in another exemplary embodiment of the present disclosure, some of the first transistor T1 and the second transistor T2 may be modified into a bottom-gate structure.

The intermediate organic layer 30 covering the first input electrode DE1, the second input electrode DE2, the first output electrode SE1 and the second output electrode SE2 is formed on the second intermediate inorganic layer 20. The intermediate organic layer may provide a flat surface.

The display element layer DP-OLED is disposed on the intermediate organic layer 30. In an embodiment, the display element layer DP-OLED includes a pixel defining layer PDL and an organic light-emitting diode OLED. The pixel defining layer PDL may include an organic material. A first electrode AE is disposed on the intermediate organic layer 30. The first electrode AE is connected to the second output electrode SE2 via a fifth through-hole CH5 passing through the intermediate organic layer 30. An opening OP is defined in the pixel defining layer PDL. The opening OP of the pixel defining layer PDL exposes at least a part of the first electrode AE. In an exemplary embodiment, the pixel defining layer PDL is eliminated.

The pixel PX may be disposed in the display area DP-DA. The display area DP-DA may include an emission area PXA and a non-emission area NPXA adjacent to the emission area PXA. The non-emission area NPXA may surround the emission area PXA. In an exemplary embodiment, the emission area PXA is defined to correspond to a portion of the first electrode AE exposed via the opening OP.

According to an exemplary embodiment of the present inventive concept, the emission area PXA may overlap the first transistor T1 and/or the second transistor and T2. The opening OP may become wider, so do the first electrode AE and an emissive layer EML described later.

In an embodiment, a hole control layer HCL is disposed across in the emission area PXA and the non-emission area NPXA. Although not shown in the drawings, a common layer such as the hole control layer HCL may be formed across the pixels PX (see FIG. 3).

The emissive layer EML is disposed on the hole control layer HCL. The emissive layer EML may be disposed in an area corresponding to the opening OP. That is to say, the emissive layer EML may be separately formed in each of the pixels PX. The emissive layer EML may include an organic material and/or an inorganic material. In an embodiment, the emissive layer EML generates a predetermined colored light.

Although a patterned emissive layer EML is illustrated in FIG. 5, the emissive layer EML may be disposed across the pixels PX in alternate embodiments. The emissive layer EML may generate white light. In addition, the emissive layer EML may have a multi-layer structure known as a tandem structure.

An electron control layer ECL is disposed on the emissive layer EML. Although not shown in the drawings, the electron control layer ECL may be formed across the pixels PX (see FIG. 3). A second electrode CE is disposed on the electron control layer ECL. The second electrode CE is disposed across the pixels PX.

A thin-film encapsulation layer TFE is disposed on the second electrode CE. The thin-film encapsulation layer TFE is disposed across the pixels PX. According to an exemplary embodiment, the thin-film encapsulation layer TFE directly covers the second electrode CE. According to an exemplary embodiment, a capping layer covering the second electrode CE is further disposed between the thin-film encapsulation layer TFE and the second electrode CE. The thin-film encapsulation layer TFE can directly cover the capping layer.

In an exemplary embodiment, the thin-film encapsulation layer TFE includes a first encapsulation inorganic layer IOL1, an encapsulation organic layer OL and a second encapsulation inorganic layer IOL2 sequentially stacked on the second electrode CE.

In some exemplary embodiments, each of the first encapsulation inorganic layer IOL1 and the second encapsulation inorganic layer IOL2 may be made of silicon nitride, aluminum nitride, zirconium nitride, titanium nitride, hafnium nitride, tantalum nitride, silicon oxide, aluminum oxide, titanium oxide, tin oxide, cerium oxide, silicon oxynitride (SiON), or lithium fluoride.

In some embodiments of the present disclosure, the encapsulation organic layer OL may be made of acrylic resin, methacrylic resin, polyisoprene, vinyl resin, epoxy resin, urethane resin, cellulose resin, or perylene resin.

It is to be noted that the structure of the thin-film encapsulation layer TFE is not limited to the above example. The stack structure of the thin-film encapsulation layer TFE may be altered in a variety of ways.

According to an exemplary embodiment of the present inventive concept, the organic light-emitting diode OLED further includes a resonance structure for controlling the resonance distance of light generated in the emissive layer EML. The resonance structure may be disposed between the first electrode AE and the second electrode CE, and the thickness of the resonance structure may be determined based on the wavelength of the light generated in the emissive layer EML.

Figure 6:
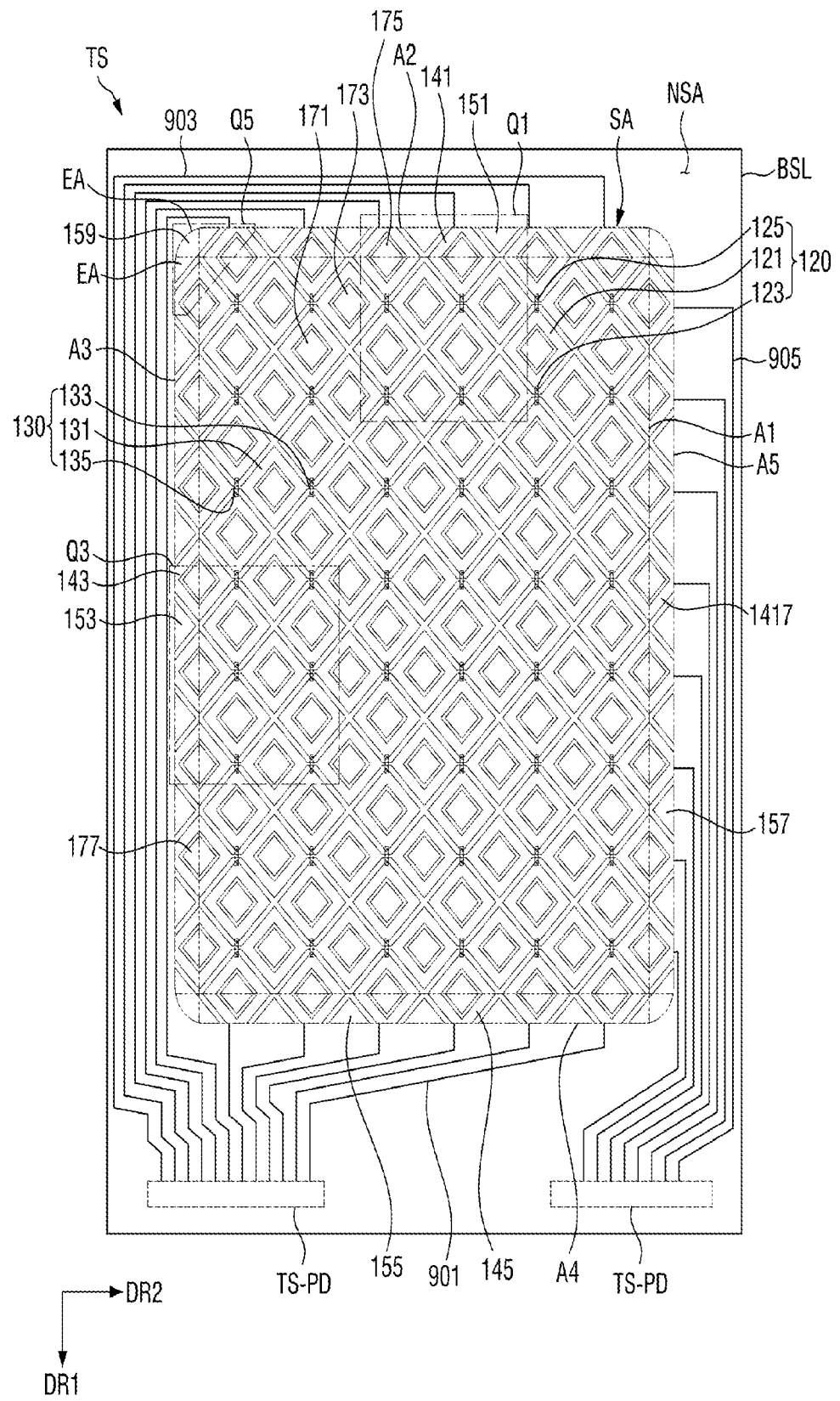
FIG. 6 is a plan view of a touch sensor included in a display device according to an exemplary embodiment of the present inventive concept.
Figure 7:
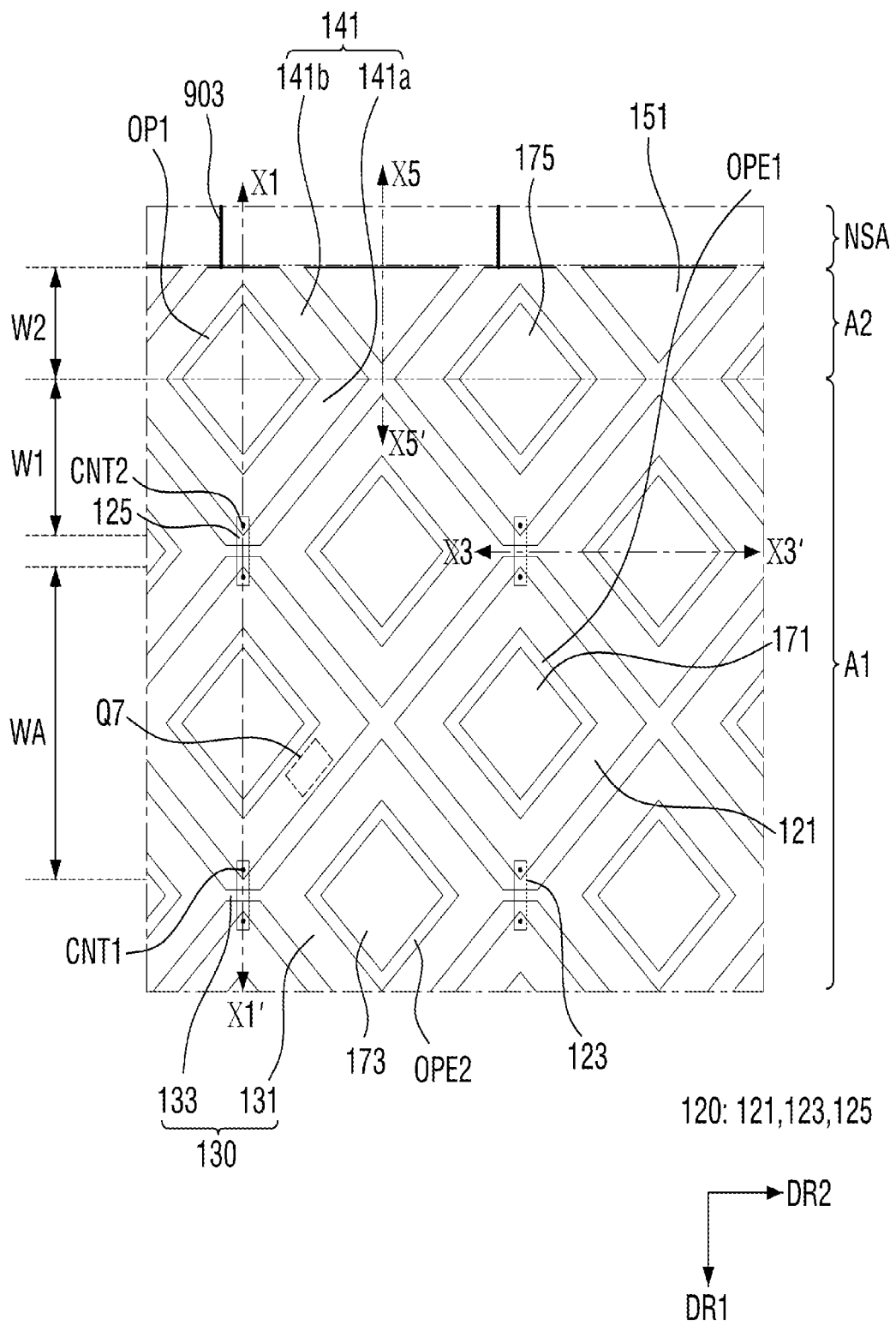
FIG. 7 is an enlarged plan view of Q1 portion of FIG. 6.
Figure 8:
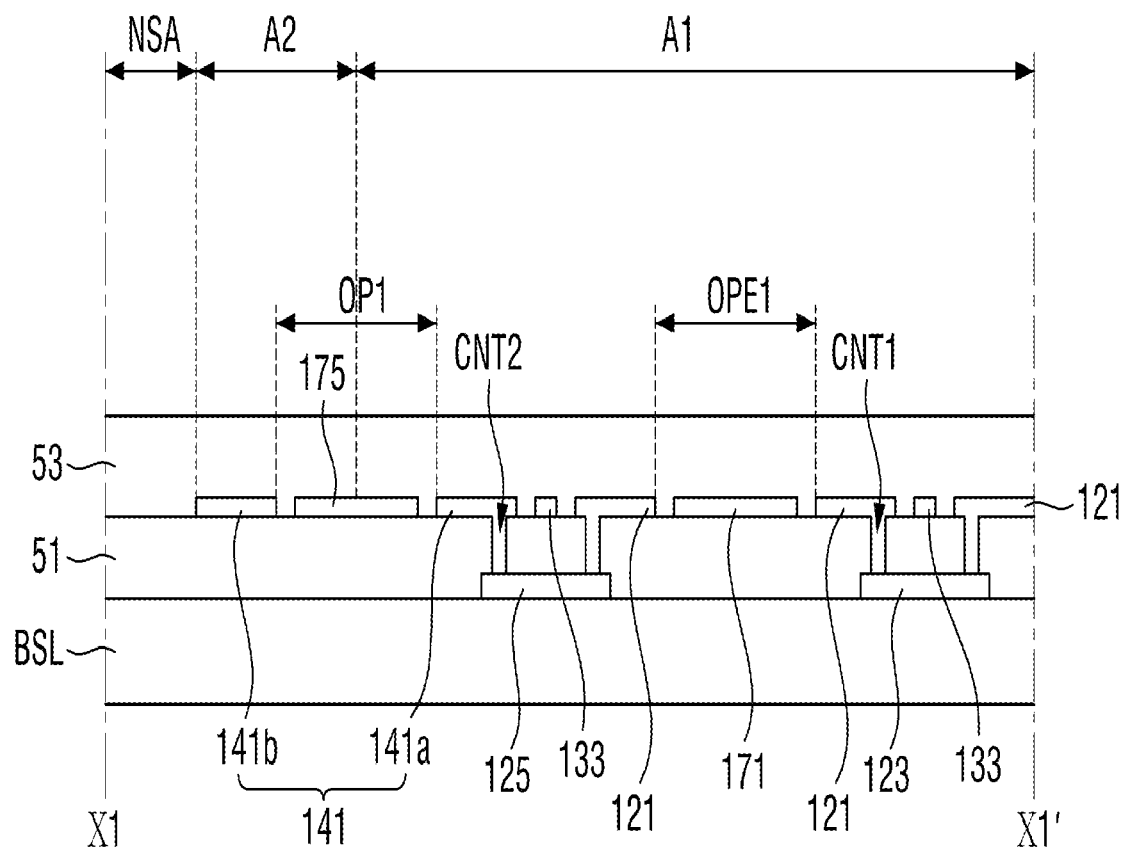
FIG. 8 is a cross-sectional view taken along line X1-X1' of FIG. 7.
Figure 9:
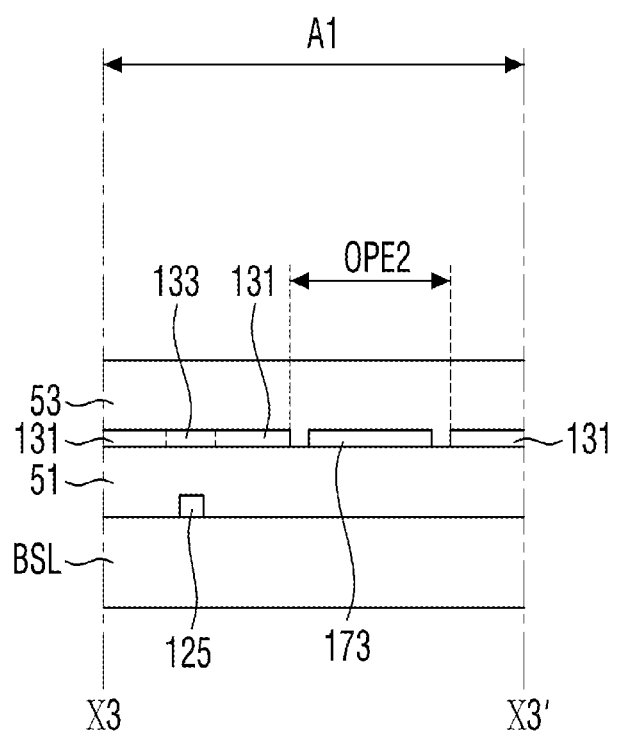
FIG. 9 is a cross-sectional view taken along line X3-X3' of FIG. 7.
Figure 10:
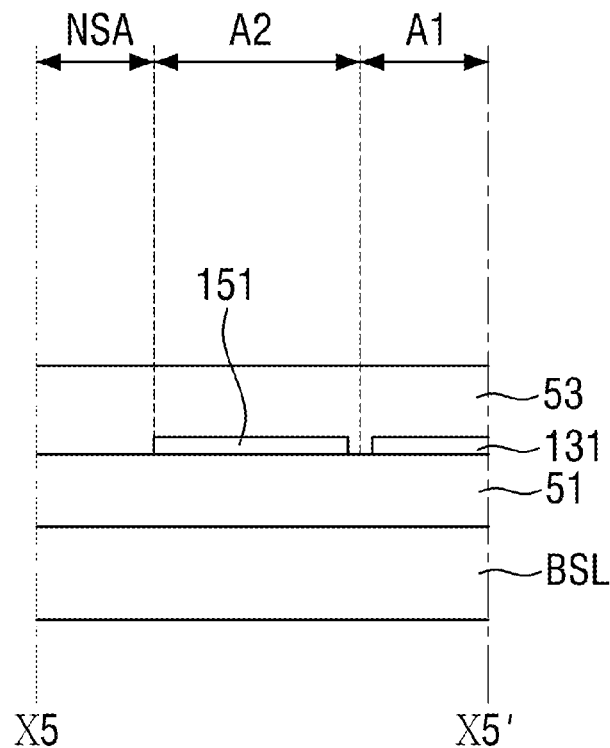
FIG. 10 is a cross-sectional view taken along line X5-X5' of FIG. 7.
Figure 11:
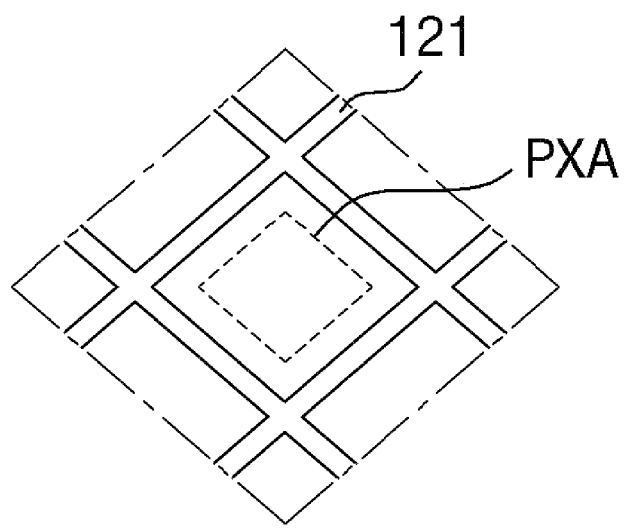
FIG. 11 is an enlarged plan view of Q7 portion of FIG. 7.
Figure 12:
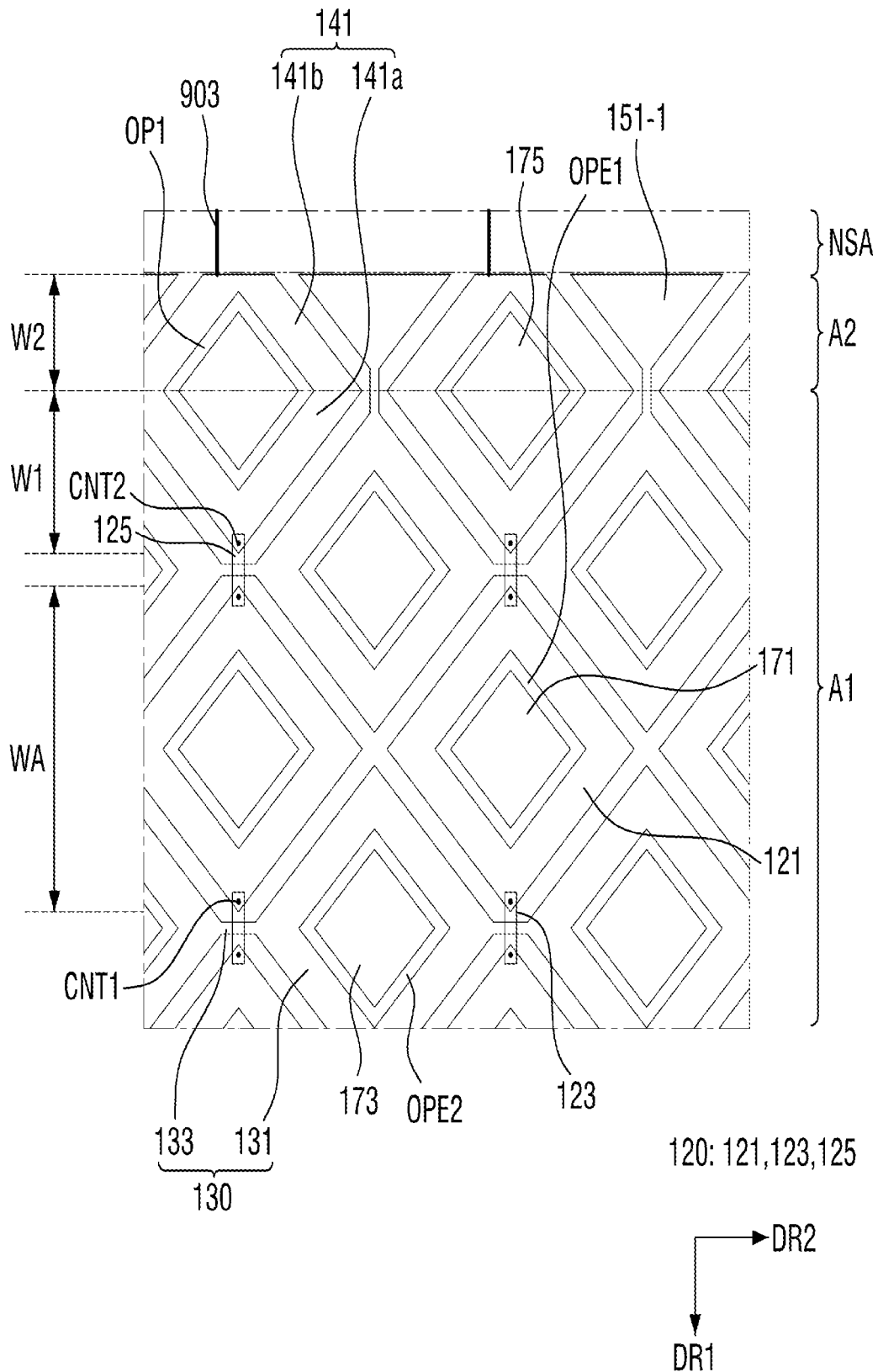
FIG. 12 is a plan view showing a modification of the structure shown in FIG. 7.
Figure 13:
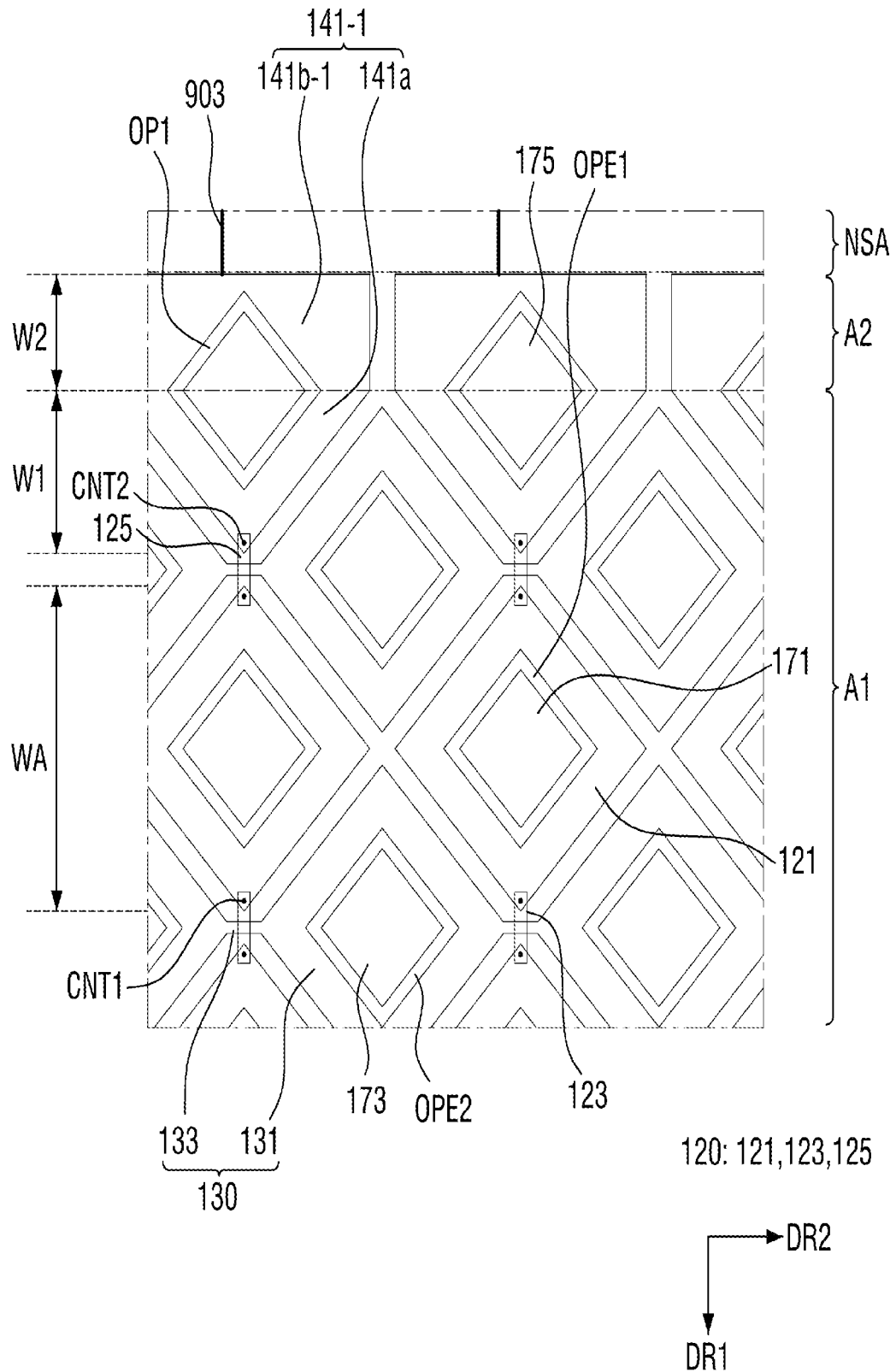
FIG. 13 is a plan view showing another modification of the structure shown in FIG. 7.
Figure 14:
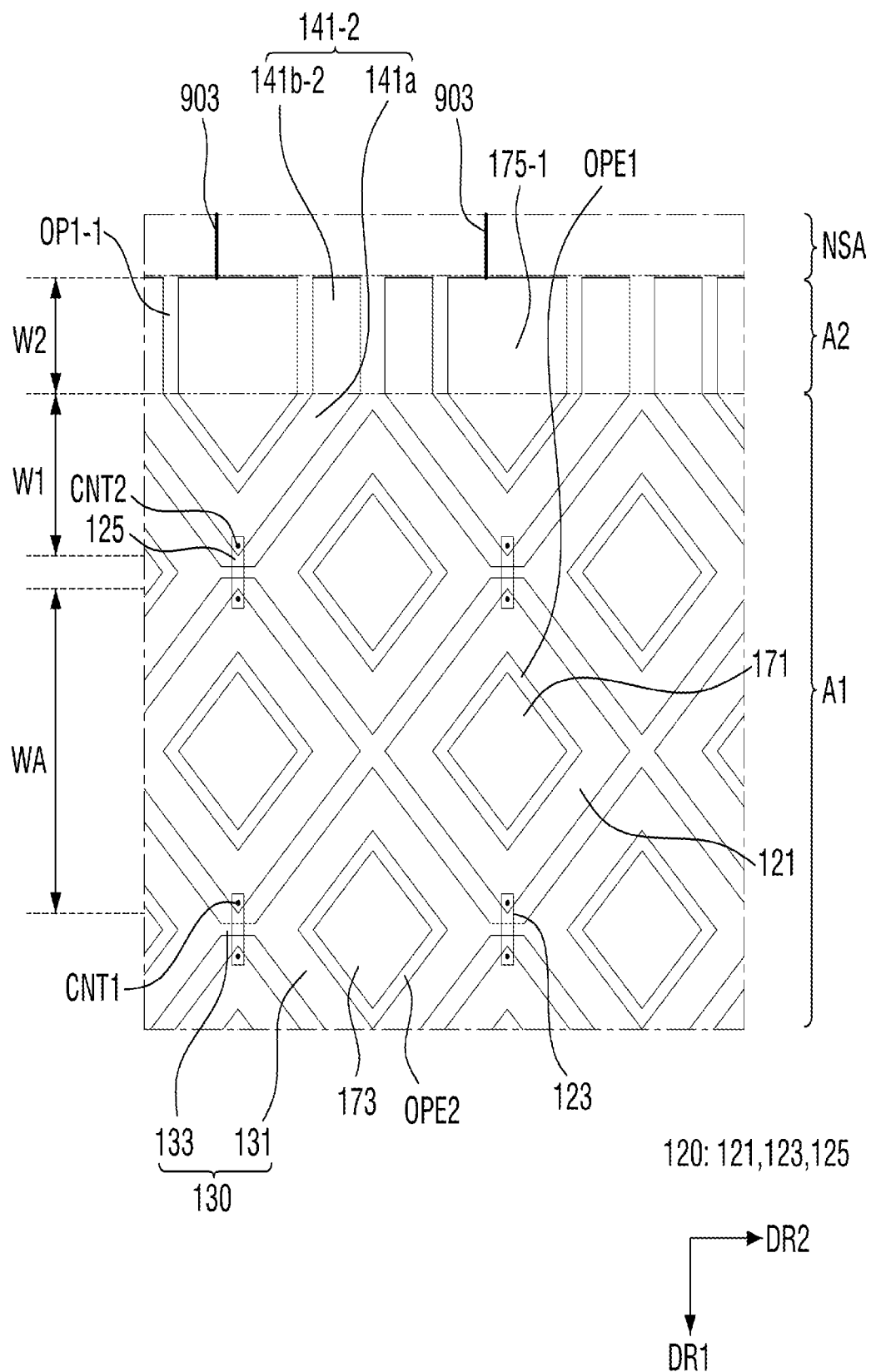
FIG. 14 is a plan view showing yet another modification of the structure shown in FIG. 7.
Figure 15:
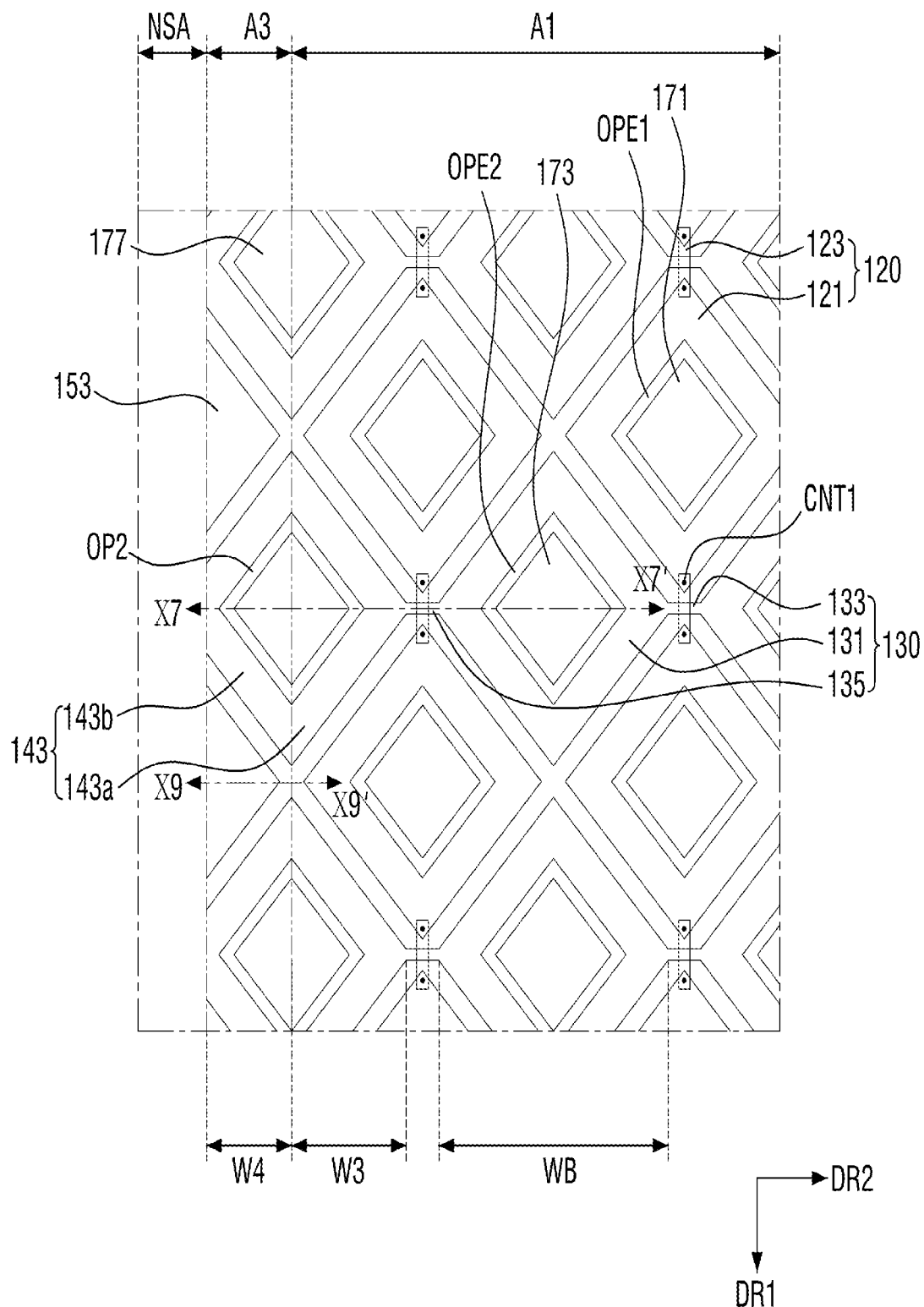
FIG. 15 is an enlarged plan view of Q3 portion of FIG. 6.
Figure 16:
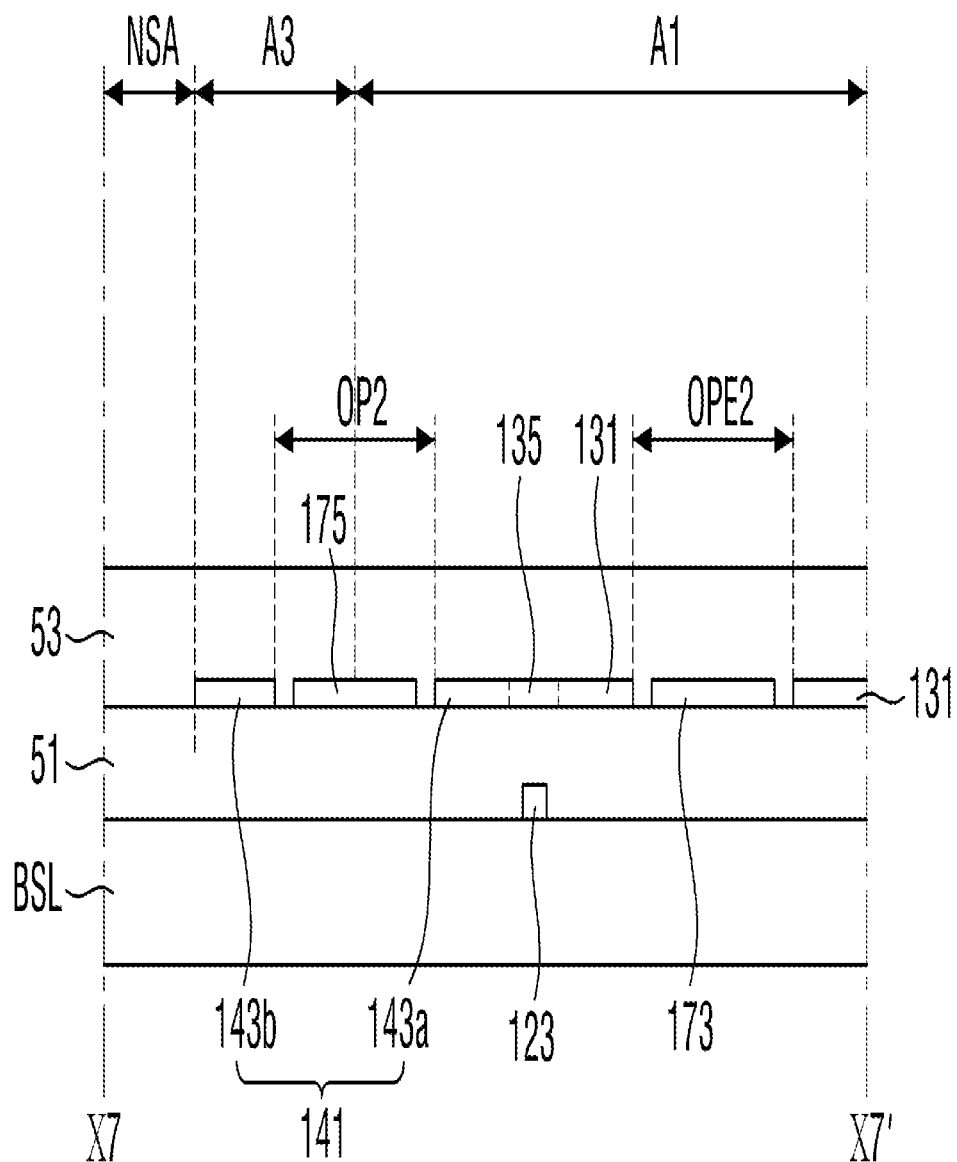
FIG. 16 is a cross-sectional view taken along line X7-X7' of FIG. 15.
Figure 17:
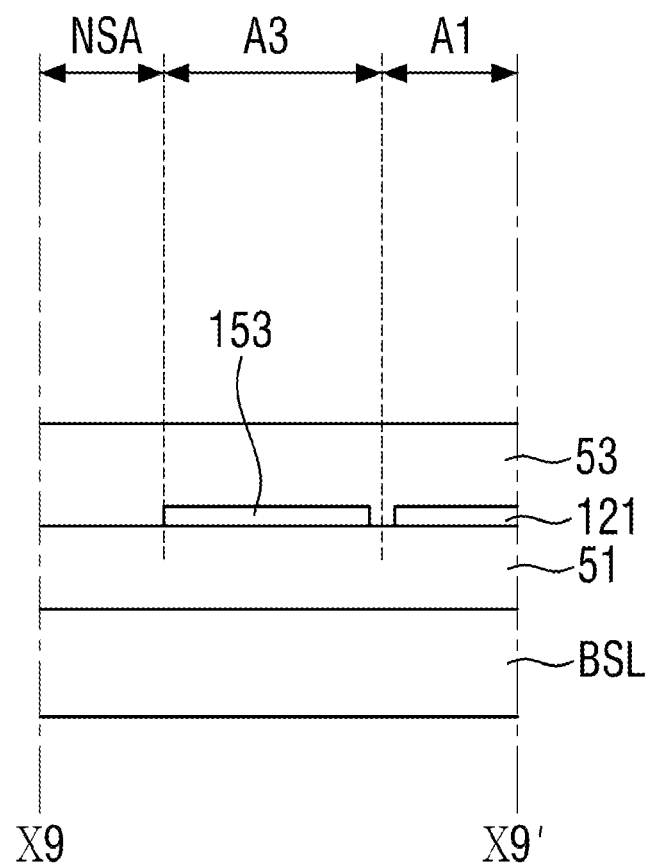
FIG. 17 is a cross-sectional view taken along line X9-X9' of FIG. 15.
Figure 18:
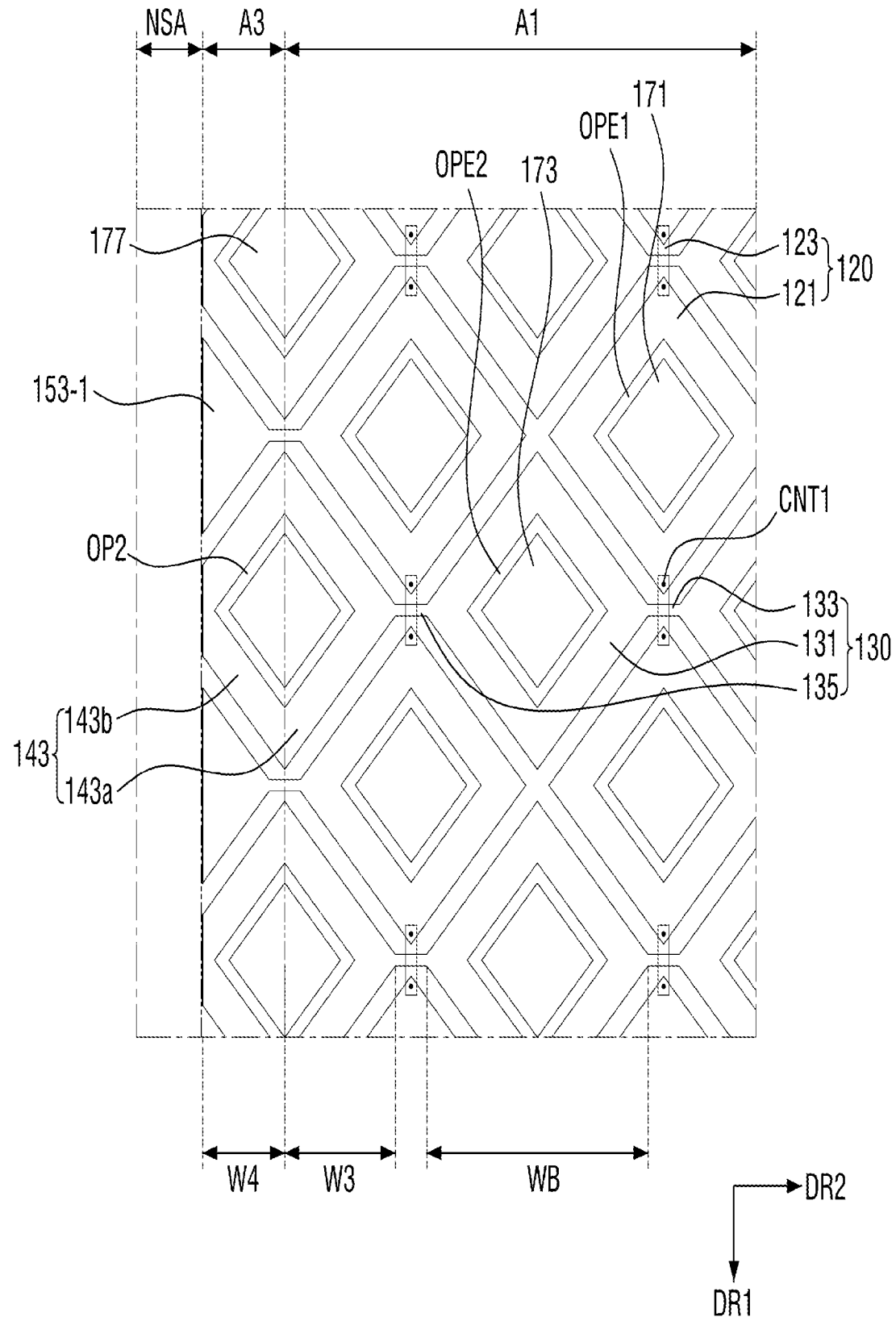
FIG. 18 is a plan view showing a modification of the structure shown in FIG. 15.
Figure 19:
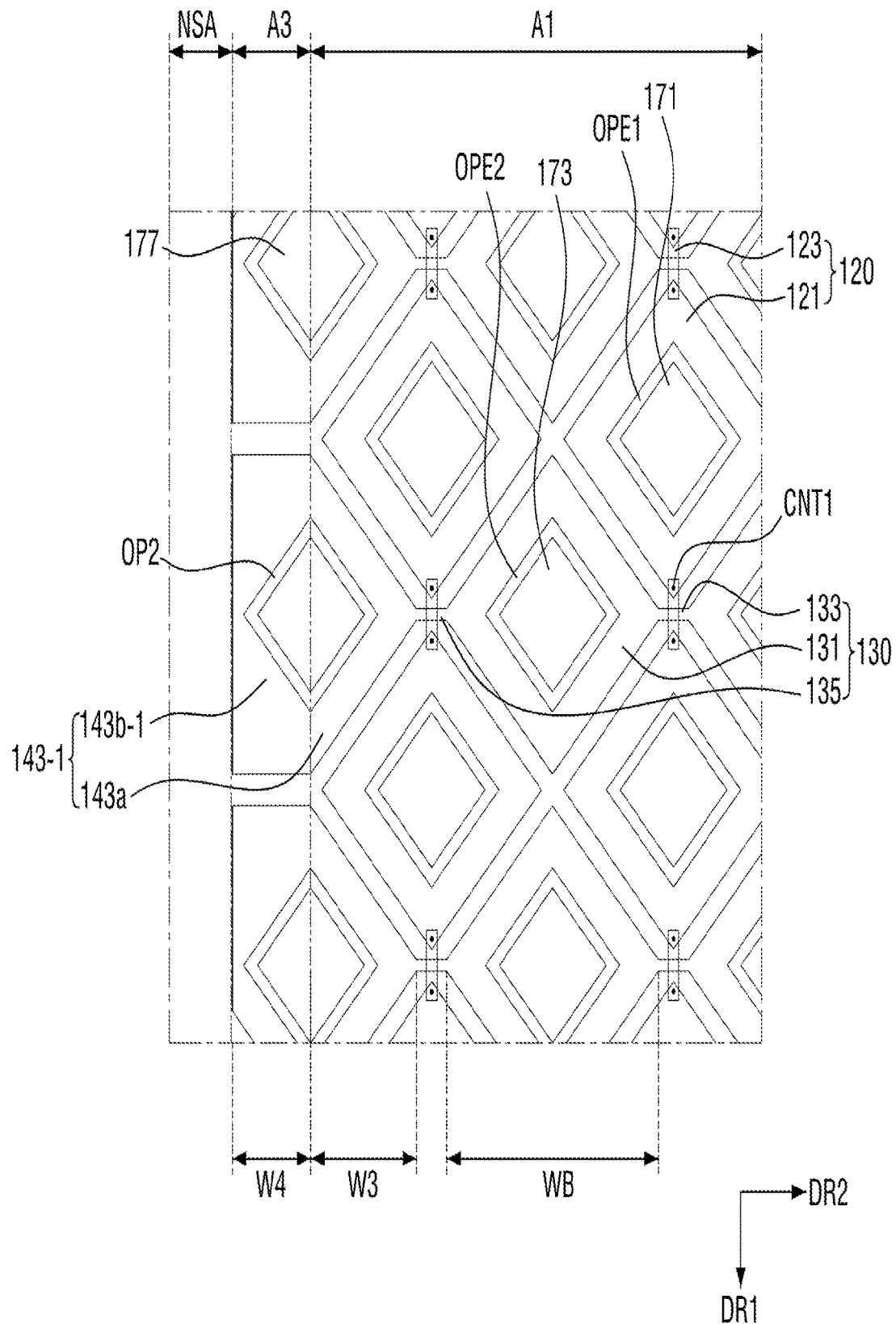
FIG. 19 is a plan view showing another modification of the structure shown in FIG. 15.
Figure 20:
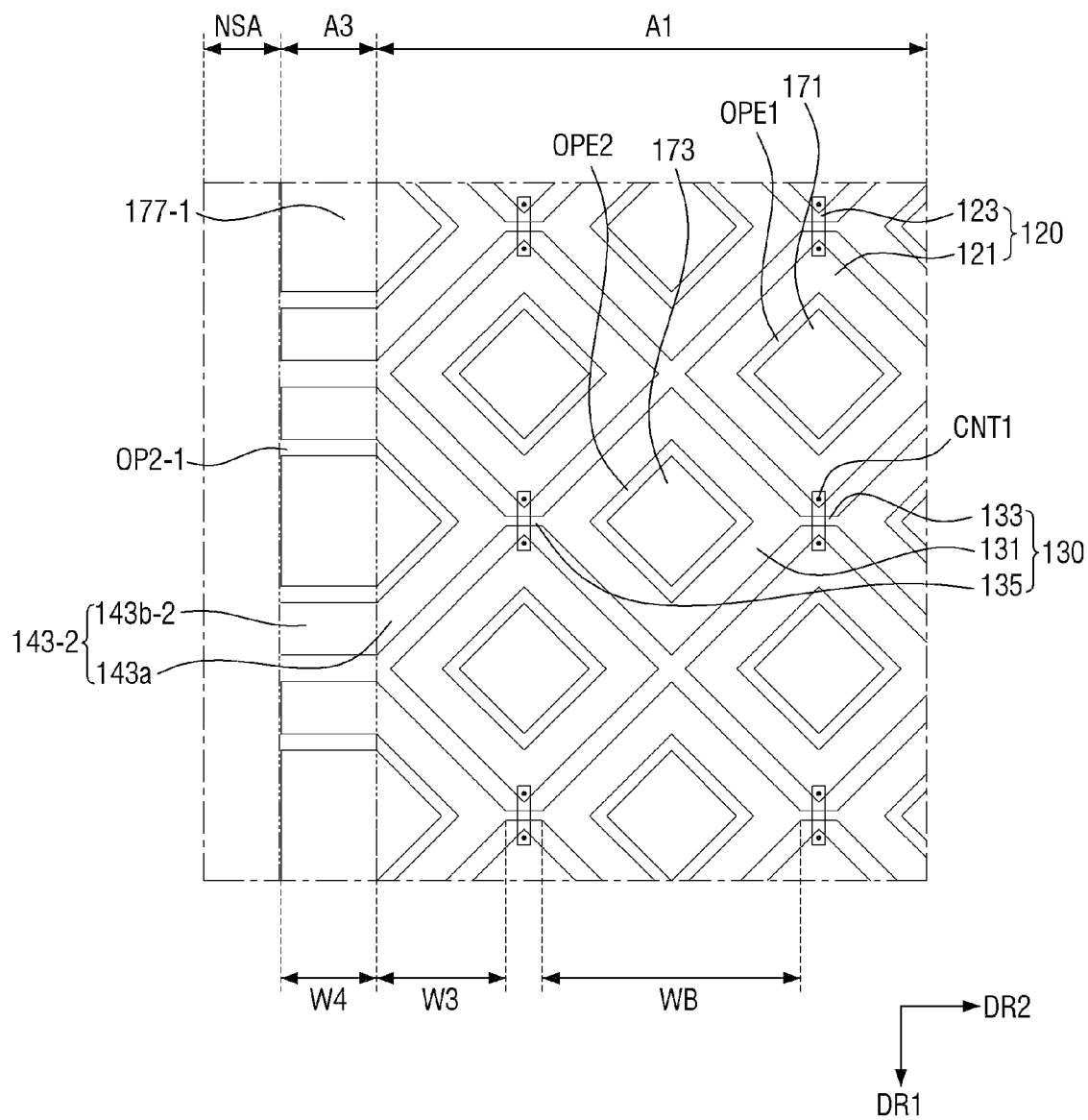
FIG. 20 is a plan view showing yet another modification of the structure shown in FIG. 15.

FIG. 6 is a plan view of a touch sensor included in a display device according to an exemplary embodiment of the present inventive concept. FIG. 7 is an enlarged plan view of a Q1 portion of FIG. 6. FIG. 8 is a cross-sectional view taken along line X1-X1' of FIG. 7. FIG. 9 is a cross-sectional view taken along line X3-X3' of FIG. 7. FIG. 10 is a cross-sectional view taken along line X5-X5' of FIG. 7. FIG. 11 is an enlarged plan view of a Q7 portion of FIG. 7. FIG. 12 is a plan view showing a modification of the structure shown in FIG. 7. FIG. 13 is a plan view showing another modification of the structure shown in FIG. 7. FIG. 14 is a plan view showing yet another modification of the structure shown in FIG. 7. FIG. 15 is an enlarged plan view of a Q3 portion of FIG. 6. FIG. 16 is a cross-sectional view taken along line X7-X7' of FIG. 15. FIG. 17 is a cross-sectional view taken along line X9-X9' of FIG. 15. FIG. 18 is a plan view showing a modification of the structure shown in FIG. 15. FIG. 19 is a plan view showing another modification of the structure shown in FIG. 15. FIG. 20 is a plan view showing yet another modification of the structure shown in FIG. 15.

Referring to FIGS. 6 to 20, the touch sensor TS includes a base layer BSL, a first electrode unit 120, a second electrode unit 130, and a first electrode pattern 141, and may further include at least one of a second electrode pattern 143, a third electrode pattern 145, and a fourth electrode pattern 147. In addition, the touch sensor TS may include a first conductive pattern 151 and may further include at least one of a second conductive pattern 153, a third conductive pattern 155, and a fourth conductive pattern 157. In some exemplary embodiments, the touch sensor TS further includes an edge conductive pattern 159. Elements of the touch sensor TS other than the base layer BSL may be included in the touch element layer TC described above with reference to FIG. 2.

The base layer BSL may function as a base of the touch sensor TS, and in some exemplary embodiments, the base layer BSL may include at least one of the layers forming the display panel as described above. For example, the base layer BSL may be made up of at least one layer of the display panel, e.g., a layer including a thin-film encapsulation layer.

In an embodiment, the base layer BSL includes a sensing area SA and a peripheral area NSA on a plane.

In an embodiment, the sensing area SA is an area of the touch sensor TS for sensing a touch input, and the peripheral area NSA is an area of the touch sensor TS not capable of sensing a touch input. In an exemplary embodiment, the peripheral area NSA surrounds the sensing area SA. The sensing area SA and the peripheral area NSA may correspond to the display area DM-DA and the non-display area DM-NDA, respectively, of the display device 1 shown in FIG. 1. Alternatively, the sensing area SA and the peripheral area NSA may correspond to the display area DA and the non-display area NDA, respectively, of the display panel DP shown in FIG. 3. In an exemplary embodiment, the sensing area SA is substantially identical to or identical to the display area DA of the display panel DP. In an exemplary embodiment, when the edges of the display area DA of the display panel DP are rounded, the edges of the sensing area SA are also rounded.

In an exemplary embodiment, the sensing area SA includes a first area A1 and a second area A2. The first area A1 may be defined as a region where the first electrode unit 120 and the second electrode unit 130 are disposed. The second area A2 is located on one side of the first area A1 in the first direction DR1 of the sensing area SA, and may be defined as a region where a part of the first electrode pattern 141 is located or where the first conductive pattern 151 is located.

In an exemplary embodiment, the sensing area SA further includes a third area A3. The third area A3 is located on one side of the first area A1 in the second direction DR2 of the sensing area SA, and may be defined as a region where a part of the second electrode pattern 143 is located or where the second conductive pattern 153 is located.

In an exemplary embodiment, the sensing area SA further includes an edge area EA. The edge area EA is a region including the edge of the sensing area SA and may be surrounded by the first area A1, the second area A2, the third area A3 and the peripheral area NSA.

In an exemplary embodiment, the sensing area SA includes a fourth area A4 and a fifth area A5. The fourth area A4 may be a region located on the opposite side of the second area A2 with the first area A1 therebetween. The fifth area A5 may be a region located on the opposite side of the third area A3 with the first area A1 therebetween.

Hereinafter, the first area A1 will be described.

The first electrode unit 120 and the second electrode unit 130 insulated from the first electrode unit 120 may be disposed on the base layer BSL. In an embodiment, the first electrode unit 120 and the second electrode unit 130 are located in the first area A1 of the sensing area SA.

In the first area A1, the first electrode unit 120 may be extended in the first direction DR1. More than one first electrode unit 120 may be disposed, so that multiple first electrode units 120 are spaced apart from one another in the second direction DR2.

The first electrode unit 120 may include a plurality of first touch electrodes 121 arranged in the first direction DR1, and a first connecting part 123 electrically connecting between the first touch electrodes 121 adjacent to each other in the first direction DR1. In addition, the first electrode unit 120 may further include a second connecting part 125 connected to the first electrode pattern 141. In the following description of the exemplary embodiments, the term "connection" may encompass physical and/or electrical connection.

In an exemplary embodiment, the first touch electrode 121 has a diamond shape when viewed from the top, but it is not limited thereto. For example, the first touch electrode 121 may have a variety of shapes such as a triangle, a square, a pentagon, a circle and a bar.

In an embodiment, the first touch electrode 121 includes a conductive material. For example, the conductive material may include a metal or an alloy thereof. Examples of the metal may include gold (Au), silver (Ag), aluminum (Al), molybdenum (Mo), chrome (Cr), titanium (Ti), nickel (Ni), neodymium (Nd), copper (Cu), platinum (Pt), etc. In an embodiment, the first touch electrode 121 is made of a transparent conductive material. Examples of the transparent conductive material may include silver nanowire (AgNW), indium tin oxide (ITO), indium zinc oxide (IZO), antimony zinc oxide (AZO), indium tin zinc oxide (ITZO), zinc oxide (ZnO) and tin oxide ($SnO_2$), carbon nano tube, graphene, and conductive polymers such as PEDOT.

In some exemplary embodiments, the first touch electrode 121 may be implemented by a single-layer structure or a multi-layer structure. When the first touch electrode 121 has a multi-layer structure, the first touch electrode 121 may include multiple metal layers. For example, the first touch electrode 121 may have a three-layer structure of titanium/aluminum/titanium.

In an exemplary embodiment, the first touch electrode 121 has a mesh structure so that it is not observable by a viewer. When the first touch electrode 121 has a mesh structure, the first touch electrode 121 may be disposed such that it does not overlap with the emission area PXA to prevent it from being observed by a viewer, as shown in FIG. 11. In other words, a mesh hole overlapping with the emission area PXA may be defined in the first touch electrodes 121 having the mesh structure. For example, the mesh structure may be positioned so that a hole of the mesh structure overlaps the emission area PXA.

In an embodiment, the first touch electrode 121 includes a first electrode opening OPE1. For example, at least the center portion of each of the first touch electrodes 121 may be open, so that a layer disposed thereunder is exposed through it. For example, when a first insulating layer 51 is disposed under the first touch electrode 121, a part of the first insulating layer 51 is exposed through the first electrode opening OPE1. In an exemplary embodiment, the first electrode opening OPE1 has a diamond shape when viewed from the top. It is, however, to be understood that the present disclosure is not limited thereto.

The first connecting part 123 electrically connects the first touch electrodes 121 adjacent to each other in the first direction DR1 and may come in contact with the first touch electrodes 121. In an exemplary embodiment, the first connecting part 123 is implemented as a bridge-type connection pattern. In an exemplary embodiment, the first connecting part 123 is located on a layer different from the layer where the first touch electrode 121 is located.

In an embodiment, the first connecting part 123 includes a conductive material. In some exemplary embodiments, the first connecting part 123 may include the same material as the first touch electrode 121 or may include at least one material selected from the materials listed above as the materials of the first touch electrode 121. In some exemplary embodiments, the first connecting part 123 may be implemented by a single-layer or multiple layers. For example, the first connecting part 123 may have a three-layer structure of titanium/aluminum/titanium.

In an exemplary embodiment, the first insulation layer 51 is disposed between the first touch electrode 121 and the first connecting part 123. That is to say, the first connecting part 123 may be disposed on the base layer BSL, the first insulation layer 51 may be disposed on the first connecting part 123, and the first touch electrode 121 may be disposed on the first insulation layer 51. The first connecting part 123 may be connected to the first touch electrode 121 through a first contact hole CNT1 formed in the first insulation layer 51.

In an embodiment, the first insulating layer 51 includes an insulating material. In some exemplary embodiments, the insulating material may be an inorganic insulating material or an organic insulating material. The inorganic insulating material may include at least one of aluminum oxide, titanium oxide, silicon oxide, silicon oxynitride, zirconium oxide, and hafnium oxide. The organic insulating material may include at least one selected from the group consisting of: an acrylic resin, a methacrylic resin, a polyisoprene, a vinyl resin, an epoxy resin, a urethane resin, a cellulose resin, a siloxane resin, a polyimide resin, a polyamide resin, and a perylene resin.

In an embodiment, the first connecting part 123 includes a conductive material. In some exemplary embodiments, the first connecting part 123 may include the same material as the first touch electrode 121 or may include at least one material selected from the materials listed above as the materials of the first touch electrode 121.

Although FIG. 8 shows that one first connecting part 123 is disposed between the first touch electrodes 121 adjacent to each other in the first direction DR1, the number of the first connecting parts 123 may vary. For example, unlike that shown in FIG. 8, two or more first connecting parts 123 may be disposed between the first touch electrodes 121 adjacent to each other in the first direction DR1.

The second connecting part 125 may be disposed at an end of the first electrode unit 120. For example, the second connecting part 125 may be disposed at a portion of the end of the first electrode unit 120 that is adjacent to the first electrode pattern 141 in the first direction DR1. In an embodiment, the second connecting part 125 electrically connects one of the first touch electrodes 121 of the first electrode unit 120 adjacent to the first electrode pattern 141 in the first direction DR1 with the first electrode pattern 141, and may come in contact with the first touch electrode 121 and the first electrode pattern 141 through a second contact hole CNT2 formed in the first insulating layer 51.

In an exemplary embodiment, the second connecting part 125 is implemented as a bridge-type connection pattern. In some exemplary embodiments, the second connecting part 125 may be disposed on a layer different from the layer where the first touch electrode 121 is disposed and may be disposed on the same layer with the first connecting part 123. In some exemplary embodiments, the second connecting part 125 may be made of the same material as the first connecting part 123, and may have the same stack structure as the first connecting part 123.

In the first area A1, the second electrode unit 130 may be extended in the second direction DR2 as described above. More than one second electrode unit 130 may be disposed so that multiple second electrode units 130 are spaced apart from one another in the first direction DR1.

In an embodiment, the second electrode unit 130 includes a plurality of second touch electrodes 131 arranged in the second direction DR2, and a third connection unit 133 electrically connecting between the second touch electrodes 131 adjacent to each other in the second direction DR2. In some exemplary embodiments, the second electrode unit 130 may further include a fourth connecting part 135 connected to the second electrode pattern 143.

In an exemplary embodiment, the second touch electrode 131 is disposed on the same layer as the first touch electrode 121. For example, the second touch electrode 131 may be disposed on the first insulating layer 51. In an exemplary embodiment, the second touch electrode 131 has a diamond shape, but it is not limited thereto. The second touch electrode 131 may have a variety of shapes such as a triangle, a square, a pentagon, a circle and a bar.

In an embodiment, the second touch electrode 131 includes a conductive material, and may include the same material as the first touch electrode 121 in some exemplary embodiments. In some exemplary embodiments, when the first touch electrodes 121 have a multi-layer structure, the second touch electrodes 131 also have a multi-layer structure. In an embodiment, when the first touch electrode 121 has a mesh structure, the second touch electrode 131 also has a mesh structure.

In an embodiment, the third connecting part 133 electrically connects the second touch electrodes 131 adjacent to each other in the second direction DR2 and may come in contact with the second touch electrodes 131. In an exemplary embodiment, the third connecting part 133 is disposed on the same layer with the first touch electrode 121 and the second touch electrode 131. For example, the third connecting part 133 may be disposed on the first insulation layer 51, like the first touch electrode 121 and the second touch electrode 131.

The third connecting part 133 may be insulated from the first connecting part 123 via the first insulating layer 51 and may intersect with the first connecting part 123.

In an embodiment, the third connecting part 133 includes the same material as the first touch electrode 121 and the second touch electrode 131. In addition, when the first touch electrode 121 and the second touch electrode 131 have a multi-layer structure or a mesh structure, the third connecting part 133 may also having the same structure as that of the first touch electrode 121 and the second touch electrode 131.

In an embodiment, the second touch electrodes 131 include a second electrode opening OPE2. For example, at least the center portion of each of the second touch electrodes 131 may be open, so that a layer disposed thereunder may be exposed through it. In an exemplary embodiment, the second electrode opening OPE2 has a diamond shape when viewed from the top. It is, however, to be understood that the present inventive concept is not limited thereto.

The fourth connecting part 135 may be disposed at an end of the second electrode unit 130. For example, the fourth connecting part 135 may be disposed at a portion of the end of the second electrode unit 130 that is adjacent to the second electrode pattern 143 in the second direction DR2. The fourth connecting part 135 may electrically connect one of the second touch electrodes 131 of the second electrode unit 130 adjacent to the second electrode pattern 143 in the first direction DR1 with the second electrode pattern 143.

In an exemplary embodiment, the fourth connecting part 135 is disposed on the same layer with the first touch electrode 121, the second touch electrode 131 and the third connecting part 133. In addition, the fourth connecting part 135 may include the same material as the first touch electrode 121 and the second touch electrode 131 and may have the same structure as the first touch electrode 121 and the second touch electrode 131.

In an exemplary embodiment, the first electrode unit 120 is a driving electrode unit that receives a driving signal to detect a touch position. The second electrode unit 130 may be a sensing electrode that outputs a sensing signal in response to the driving signal.

In an exemplary embodiment, a first dummy pattern 171 is disposed within the first electrode opening OPE1 of the first touch electrode 121, and a second dummy pattern 173 is disposed within the second electrode opening OPE2 of the second touch electrode 131.

In an exemplary embodiment, the first dummy pattern 171 has the same shape as the first electrode opening OPE1. For example, when the first electrode opening OPE1 has a diamond shape, the first dummy pattern 171 also has a diamond shape. Similarly, the second dummy pattern 173 may have the same shape as the second electrode opening OPE2.

In an embodiment, the first dummy pattern 171 is spaced apart from the first touch electrode 121 in the first electrode opening OPE1. In an embodiment, the second dummy pattern 173 is spaced apart from the second touch electrode 131 in the second electrode opening OPE2. That is to say, each of the first dummy pattern 171 and the second dummy pattern 173 may be a floating electrode having an island shape.

In an exemplary embodiment, the first dummy pattern 171 and the second dummy pattern 173 are disposed on the same layer with the first and second touch electrodes 121 and 131. In an embodiment, the first dummy pattern 171 and the second dummy pattern 173 are formed via the same process with the first touch electrode 121 and the second touch electrode 131, and thus may include the same material and the same stack structure.

By disposing the first dummy pattern 171 and the second dummy pattern 173, it is possible to prevent the boundary region between the first touch electrode 121 and the second touch electrode 131 from being observed from the outside.

Hereinafter, the second area A2 will be described.

In the second area A2, the first electrode unit 120 and the second electrode unit 130 are not disposed.

The first electrode pattern 141 may be located on one side of the first electrode unit 120 in the first direction DR1. The first electrode pattern 141 includes a first portion 141a located in the first area A1 and a second portion 141b located in the second area A2. The second portion 141b may be extended from the first portion 141a to the second area A2 in the first direction DR1.

In an exemplary embodiment, the first portion 141a is connected to the first electrode unit 120 adjacent thereto in the first direction DR1 via the second connecting part 125 described above. In an exemplary embodiment, the shape of the first portion 141a is symmetrical with a portion of the first touch electrode 121 with respect to a line extended in the second direction DR2.

In some exemplary embodiments, the second portion 141b may be extended from the first portion 141a toward the second area A2 and may be connected to the second signal line 903 located in the peripheral area NSA. Accordingly, the first electrode unit 120 may be electrically connected to the second signal line 903 through the first electrode pattern 141 and may receive a touch signal (e.g., a driving signal) through the second signal line 903. In an exemplary embodiment, the shape of the second portion 141b is symmetrical with a portion of the first touch electrode 121 with respect to a line extended in the second direction DR2.

In an exemplary embodiment, the sum of a first maximum width W1 of the first portion 141a measured in the first direction DR1 and the second maximum width W2 of the second portion 141b measured in the first direction DR1 is less than the maximum width WA of the first touch electrode 121 measured in the first direction DR1 (e.g., see FIG. 12). In an embodiment, the sum of the first maximum width W1 of the first portion 141a and the second maximum width W2 of the second portion 141b is greater than half the maximum width WA of the first touch electrode (i.e., WA/2). In an exemplary embodiment, the first maximum width W1 of the first portion 141a is substantially equal to or equal to half the maximum width WA of the first touch electrode 121 (i.e. WA/2). In an exemplary embodiment, the first maximum width W1 of the first portion 141a is greater than the second maximum width W2 of the second portion 141b. For example, if the first maximum width W1 of the first portion 141a is substantially equal to WA/2, which is half the maximum width WA of the first touch electrode 121, the second maximum width W2 of the second portion 141b is less than WA/2 which is half the maximum width WA of the first touch electrode 121.

In some exemplary embodiments, the width of the second area A2 measured in the first direction DR1 is substantially equal to or equal to the second maximum width W2 of the second portion 141b. In addition, the width of the second area A2 measured in the first direction DR1 may be less than the maximum width WA of the first touch electrode 121. In some exemplary embodiments of the present inventive concept, the width of the second area A2 is less than half the maximum width WA of the first touch electrode 121, WA/2.

As described above, the second area A2 may have a width less than half the maximum width WA of the first touch electrode 121. Thus, typically it is difficult to further dispose a separate first touch electrode 121 in the second area A2. According to the exemplary embodiment of the present inventive concept, the first electrode pattern 141 is disposed in the first area A1 and the second area A2, and the first electrode pattern 141 is electrically connected to the first electrode unit 120. As a result, the capacitance formed between the first electrode unit 120 and the second electrode unit 130 can be increased. As the area for receiving a touch input is increased, the amount of a charge in the mutual capacitance generated when a touch input is generated can be further increased. As a result, the touch sensitivity can be improved. In addition, touch sensitivity at the edge of the sensing area SA, e.g., in the second area A2, can be improved.

In an exemplary embodiment, the first electrode pattern 141 is disposed on the same layer with the first touch electrode 121 and the second touch electrode 131. In an embodiment, the first electrode pattern 141 is formed via the same process with the first touch electrode 121 and the second touch electrode 131, and thus may include the same material and the same stack structure.

In an exemplary embodiment, a first opening OP1 is formed in the first electrode pattern 141. The first opening OP1 may include a portion located in the first area A1 and a portion located in the second area A2 and may have a shape symmetric with a part or the entirety of the first electrode opening OPE1 with respect to the line extended in the second direction DR2.

A first electrode dummy pattern 175 spaced apart from the first electrode pattern 141 may be disposed in the first opening OP1. In an exemplary embodiment, the first electrode dummy pattern 175 is located on the same layer with the first electrode pattern 141, and may include the same material and have the same stack structure.

In an embodiment, the first electrode patterns 141 are spaced apart from one another in the second direction DR2 and each of the first electrode patterns 141 may be electrically connected to the first electrode unit 120 adjacent thereto in the first direction DR1.

In an exemplary embodiment, the first conductive pattern 151 is further disposed in the second area A2. In an exemplary embodiment, the first conductive pattern 151 is disposed between two first electrode patterns 141 spaced apart from each other in the second direction DR2.

In an exemplary embodiment, the first conductive pattern 151 is located on the same layer with the first electrode pattern 141, the first touch electrode 121 and the second touch electrode 131, may include the same material and may have the same stack structure.

In an exemplary embodiment, the first conductive pattern 151 is spaced apart from the first electrode pattern 141 and the second touch electrode 131 adjacent to the first electrode pattern 141 in the first direction DR1, as shown in FIG. 7. That is to say, the first conductive pattern 151 may be a floating pattern. Since the first conductive pattern 151 is disposed in the second area A2, it is possible to prevent space between the adjacent first electrode patterns 141 from being observed from the outside.

It is to be noted that the structure of the second area A2 is not limited to that described above and may be altered in a variety of ways.

For example, as shown in FIG. 12, at least a part of a first conductive pattern 151-1 located in the second area A2 may be extended to the first area A1 and may be connected to the second touch electrode 131 adjacent thereto in the first direction DR1. That is to say, the first conductive pattern 151-1 may be electrically connected to one of the second electrode units 130 that is closest to the second area A2 in the first direction DR1. Accordingly, the capacitance formed between the first electrode unit 120 and the second electrode unit 130 can be further increased, and the area for receiving a touch input can be further increased. As a result, the amount of a charge in the mutual capacitance which occurs when a touch input is received can be further increased, so that the touch sensitivity can be improved.

In an alternative embodiment, the first conductive pattern 151 is not disposed in the second area A2 and the shape of a first electrode pattern 141-1 is changed, as shown in FIG. 13.

The shape of a first portion 141a of the first electrode pattern 141-1 may be identical or substantially identical to that shown in FIG. 8, and the shape of a second portion 141b-1 may be modified from that shown in FIG. 8. The edge of the second portion 141b-1 may be extended in parallel to the first direction DR1.

Alternatively, as shown in FIG. 14, the shape of a first portion 141a of a first electrode pattern 141-2 may be identical to or substantially identical to that shown in FIG. 8, and the edge of a second portion 141b-2 may be extended in parallel to the first direction DR1. A first opening OP1-1 may also be modified so that its edge is extended in parallel to the second direction A2 in the first direction DR1 in the second area A2. In addition, a third dummy electrode 175-1 disposed in the first opening OP1-1 may also be modified to have substantially the same shape as that of the first opening OP1-1.

Hereinafter, the third area A3 will be described.

In an embodiment, the first electrode unit 120 and the second electrode unit 130 are not disposed in the third area A3.

In an embodiment, the second electrode pattern 143 (see FIG. 15) is located on one side of the second electrode unit 130 in the second direction DR2. The second electrode pattern 143 includes a third portion 143a located in the first area A1 and a fourth portion 143b located in the third area A3. The fourth portion 143b may be extended from the third portion 143a to the third area A3 in the second direction DR2.

In an exemplary embodiment, the third portion 143a is connected to the second electrode unit 130 adjacent thereto in the second direction DR2 via the fourth connecting part 135 described above. In some exemplary embodiments, the shape of the third portion 143a may be symmetrical with a portion of the second touch electrode 131 with respect to the line extended in the first direction DR1.

In some exemplary embodiments, the shape of the fourth portion 143b may be symmetrical with a portion of the second touch electrode 131 with respect to the line extended in the first direction DR1.

In an exemplary embodiment, the sum of a third maximum width W3 of the third portion 143a measured in the second direction DR2 and a fourth maximum width W4 of the fourth portion 143b measured in the second direction DR2 is less than the maximum width WB of the second touch electrode 131 measured in the second direction DR2. In an embodiment, the sum of the third maximum width W3 of the third portion 143a and the fourth maximum width W4 of the fourth portion 143b is greater than half the maximum width WB of the second touch electrode 131 (i.e., WB/2). In an exemplary embodiment, the third maximum width W3 of the third portion 143a is substantially equal to or equal to half the maximum width WB of the second touch electrode 131 (i.e. WB/2). In an exemplary embodiment, the third maximum width W3 of the third portion 143a is greater than the fourth maximum width W4 of the fourth portion 143b. For example, if the third maximum width W3 of the third portion 143a is substantially equal to or equal to WB/2 which is half the maximum width WB of the second touch electrode 131, the fourth maximum width W4 of the fourth portion 143b is less than WB/2 which is half the maximum width WB of the second touch electrode 131.

In an exemplary embodiment, the width of the third area A3 measured in the second direction DR2 is substantially equal to or equal to the fourth maximum width W4 of the fourth portion 143b. In an embodiment, the width of the third area A3 measured in the second direction DR2 is less than the maximum width WB of the second touch electrode 131. In an exemplary embodiment of the present inventive concept, the width of the third area A3 is less than half the maximum width WB of the second touch electrode 131, WB/2.

As described above, when the third area A3 has a width less than half the maximum width WB of the second touch electrode 131, it is difficult to further dispose the separate second touch electrode 131 in the third area A3. According to the exemplary embodiment of the present inventive concept, the second electrode pattern 143 is disposed in the first area A1 and the third area A3, and the second electrode pattern 143 is electrically connected to the second electrode unit 130. As a result, the capacitance formed between the first electrode unit 120 and the second electrode unit 130 can be increased, and the area for receiving a touch input can be increased. As a result, the amount of a charge in the mutual capacitance generated when a touch input is received can be further increased, so that the touch sensitivity can be improved. In addition, the touch sensitivity at the edge of the sensing area SA, e.g., the third area A3 can be improved.

In some exemplary embodiments, the second dummy pattern 143 may be disposed on the same layer with the first electrode pattern 141, the first touch electrode 121 and the second touch electrode 131. In an embodiment, the second electrode pattern 143 is formed via the same process with the first touch electrode 121, and the second touch electrode 131, and thus may include the same material and the same stack structure.

In an exemplary embodiment, a second opening OP2 is formed in the second electrode pattern 143. In an embodiment, the second opening OP2 includes a portion located in the first area A1 and a portion located in the third area A3 and may have a shape symmetric with a part or the entirety of the second electrode opening OPE2 with respect to the line extended in the first direction DR1.

In an embodiment, a second electrode dummy pattern 177 spaced apart from the second electrode pattern 143 is disposed in the second opening OP2. In some exemplary embodiments, the second electrode dummy pattern 177 may be located on the same layer with the second electrode pattern 143, and may include the same material and have the same stack structure.

In an embodiment, the second electrode patterns 143 are spaced apart from one another in the first direction DR1, and each of the second electrode patterns 143 may be electrically connected to the second electrode unit 130 adjacent thereto in the second direction DR2.

In an exemplary embodiment, the second conductive pattern 153 is further disposed in the third area A3. In an exemplary embodiment, the third conductive pattern 153 is disposed between two second electrode patterns 143 spaced apart from each other in the first direction DR1.

In some exemplary embodiments, the second conductive pattern 153 may be located on the same layer with the second electrode pattern 143, the first touch electrode 121 and the second touch electrode 131, may include the same material and may have the same stack structure.

In an exemplary embodiment, the second conductive pattern 153 is spaced apart from the second electrode pattern 143 and the first touch electrode 121 adjacent thereto in the second direction DR2, as shown in FIG. 15. That is to say, the second conductive pattern 153 may be a floating pattern. Since the second conductive pattern 153 is disposed in the third area A3, it is possible to prevent the space between the adjacent second electrode patterns 143 from being observed from the outside.

It is to be noted that the structure of the third area A3 is not limited to that described above and may be altered in a variety of ways.

For example, as shown in FIG. 18, at least a part of a second conductive pattern 153-1 located in the third area A3 may be extended to the first area A1 and may be connected to the first touch electrode 121 adjacent thereto in the second direction DR2. That is to say, the second conductive pattern 153-1 may be electrically connected to one of the first electrode units 120 that is closest to the third area A3 in the second direction DR2. Accordingly, the area for receiving a touch input can be further increased, and the amount of a charge in the mutual capacitance generated when a touch input is received can be further increased. As a result, the touch sensitivity can be further improved.

In an alternative embodiment, the second conductive pattern 153 is not disposed in the third area A3 and the shape of a second electrode pattern 143-1 is changed, as shown in FIG. 19. For example, the second electrode pattern 143 of FIG. 15 is changed to the second electrode pattern 143-1 of FIG. 19.

The shape of a third portion 143a of the second electrode pattern 143-1 may be substantially the same as or identical to that shown in FIG. 15, and the shape of a fourth portion 143b-1 may be modified from that shown in FIG. 15. For example, the fourth portion 143b of FIG. 15 is changed to the fourth portion 143b-1 of FIG. 19. The edge of the fourth portion 143b-1 may be extended in parallel to the second direction DR2 in the third area A3.

Alternatively, as shown in FIG. 20, the shape of a third portion 143a of a second electrode pattern 143-2 may be substantially the same as or identical to that shown in FIG. 15, and the edge of a fourth portion 143b-2 may be extended in parallel to the second direction DR2 in the third direction A3. A second opening OP2-1 may also be modified so that its edge is extended in parallel to the second direction DR2 in the third area A3. In addition, a fourth dummy electrode 177-1 disposed in the second opening OP2-1 may also be modified to have substantially the same shape as that of the second opening OP2-1.

According to an exemplary embodiment of the present inventive concept, a touch sensor TS includes a combination of the structure of the second area A2 and the structure of the third area A3 described above. For example, the structure of the second area A2 may be one of the structure shown in FIG. 7, the structure shown in FIG. 12, the structure shown in FIG. 13, and the structure shown in FIG. 14. The structure of the third area A3 may be one of the structure shown in FIG. 15, the structure shown in FIG. 18, the structure shown in FIG. 19, and the structure shown in FIG. 20.

In an alternative embodiment, a touch sensor TS includes one of the structures of the second area A2 described above, but does not include the third area A3. In an alternative embodiment, a touch sensor TS includes one of the structures of the third area A3 described above, but does not include the second area A2.

Hereinafter, the fourth area A4 will be described.

In an embodiment, a part of the third electrode pattern 145 is located in the fourth area A4, and the third conductive pattern 155 may be further located in the fourth area A4. In an embodiment, the third electrode pattern 145 is connected to the first electrode unit 120 via a second connecting part 125 provided at an end of the first electrode unit 120 adjacent to the fourth area A4.

The structure of the fourth area A4 may be substantially symmetrical with the structure of the second area A2. For example, the shape of the third electrode pattern 145 may be symmetrical with the shape of the first electrode pattern 141 with respect to the line extending in the second direction DR2. The shape of the third conductive pattern 155 may be symmetrical with the shape of the first conductive pattern 151 with respect to the line extending in the second direction DR2. Besides, the structure of the fourth area A4 may have a shape symmetric with one of the structure of the second area shown in FIG. 7, the structure of the second area shown in FIG. 12, the structure of the second region shown in FIG. 13, and the structures of the second area shown in FIG. 14.

In some embodiments, the fourth area A4 is eliminated.

Hereinafter, the fifth area A5 will be described.

In an embodiment, a part of the fourth electrode pattern 147 is located in the fifth area A5, and the fourth conductive pattern 157 may be further located in the fifth area A5. In an embodiment, the fourth electrode pattern 147 is connected to the second electrode unit 130 via a fourth connecting part 135 provided at an end of the second electrode unit 130 adjacent to the fourth area A4.

The structure of the fifth area A5 may be substantially symmetrical with the structure of the third area A3. For example, the shape of the fourth electrode pattern 147 may be symmetrical with the shape of the second electrode pattern 143 with respect to the line extending in the first direction DR1. The shape of the fourth conductive pattern 157 may be symmetrical with the shape of the second conductive pattern 153 with respect to the line extending in the first direction DR1. Besides, the structure of the fifth area A5 may have a shape symmetric with one of the structure of the third area shown in FIG. 15, the structure of the third area shown in FIG. 18, the structure of the third region shown in FIG. 19, and the structure of the third area shown in FIG. 20.

In an exemplary embodiment, the fifth area A5 is eliminated.

Hereinafter, the periphery area NSA will be described.

In an embodiment, the signal lines 901, 903 and 905 may be disposed on the base layer BLS in the peripheral area NSA.

For example, the signal lines 901, 903 and 905 may include a first signal line 901 and a second signal line 903 electrically connected to the respective first electrode unit 120, and a third signal line 905 electrically connected to the respective second electrode unit 130.

In an exemplary embodiment, the second electrode unit 130 is electrically connected to the third signal line 905 via the fourth electrode pattern 147 as shown in FIG. 6. In an alternative embodiment, unlike that shown in the drawings, the second electrode unit 130 is electrically connected to the third signal line 905 via the second electrode pattern 143. In an alternative embodiment, the fourth electrode pattern 147 is eliminated, and the third signal line 905 is directly connected to one end of the second electrode unit 130. In some exemplary embodiments, the third signal line 905 may be made up of, but is not limited to, a single routing structure.

In an embodiment, one end of the third signal line 905 is electrically connected to the second electrode unit 130, and the other end of the third signal line 905 is electrically connected to the touch pads TS-PD.

In an exemplary embodiment, one end of the first electrode unit 120 may be electrically connected to the second signal line 903 through the first electrode pattern 141 as shown in FIG. 6. In this embodiment, the other end of the first electrode unit 120 is connected to the first signal line 901 through the third electrode pattern 145. In an exemplary embodiment, the third electrode pattern 145 is eliminated, and the other end of the first electrode unit 120 is directly connected to the first signal line 901. That is to say, the signal lines connected to the first electrode unit 120 may have a double routing structure, and accordingly a resistance-capacitance RC delay caused by the resistance of the first electrode unit 120 can be reduced.

In an embodiment, one end of each of the first signal line 901 and the second signal line 903 are electrically connected to the first electrode unit 120, and the other end of each of the first signal line 901 and the second signal line 903 are electrically connected to the touch pads TS-PD.

In some exemplary embodiments, the first signal line 901, the second signal line 903 and the third signal line 905 may include the same material as the first touch electrode 121 and the second touch electrode 131 and may be disposed on the same layer with them. Alternatively, the first signal line 901, the second signal line 903 and the third signal line 905 may have a structure that includes a first conductive layer made of the same material as the first connecting part 123 and disposed on the same layer with it, and a second conductive layer made of the same material as the first touch electrode 121 and disposed on the same layer with it. When the first signal line 901, the second signal line 903 and the third signal line 905 have the structure that includes the first conductive layer and the second conductive layer, the first conductive layer may be connected to the second conductive layer via a hole formed in the first insulating layer 51.

In an embodiment, a second insulating layer 53 is disposed on the first electrode unit 120, the second electrode unit 130, the first electrode pattern 141, the second electrode pattern 143, the third electrode pattern 145, the fourth electrode pattern 147, the first conductive pattern 151, the second conductive pattern 153, and the fourth conductive pattern 157. In some exemplary embodiments, the second insulating layer 53 may be made of an organic insulating material and may include at least one of the organic insulating materials listed above as the examples of the material of the first insulating layer 51.

Figure 21:
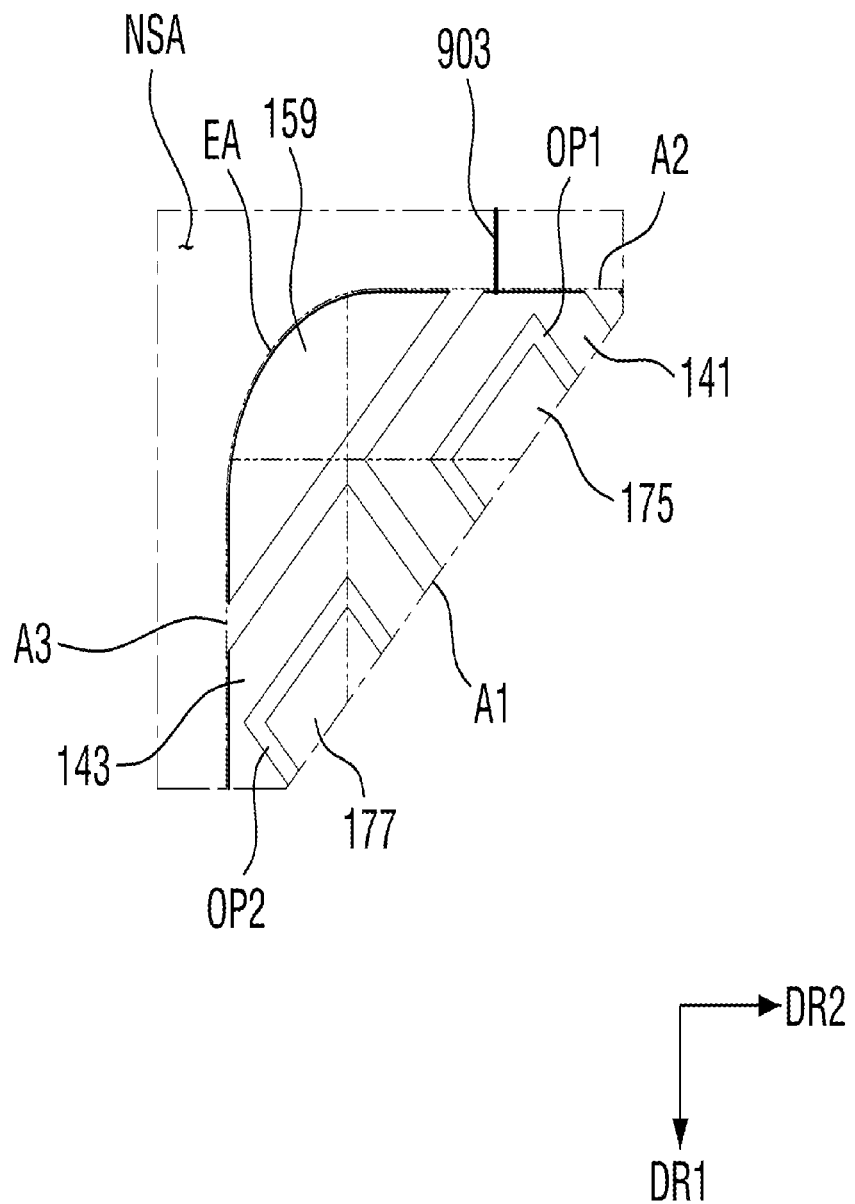
FIG. 21 is an enlarged plan view of Q5 portion of FIG. 6.
Figure 22:
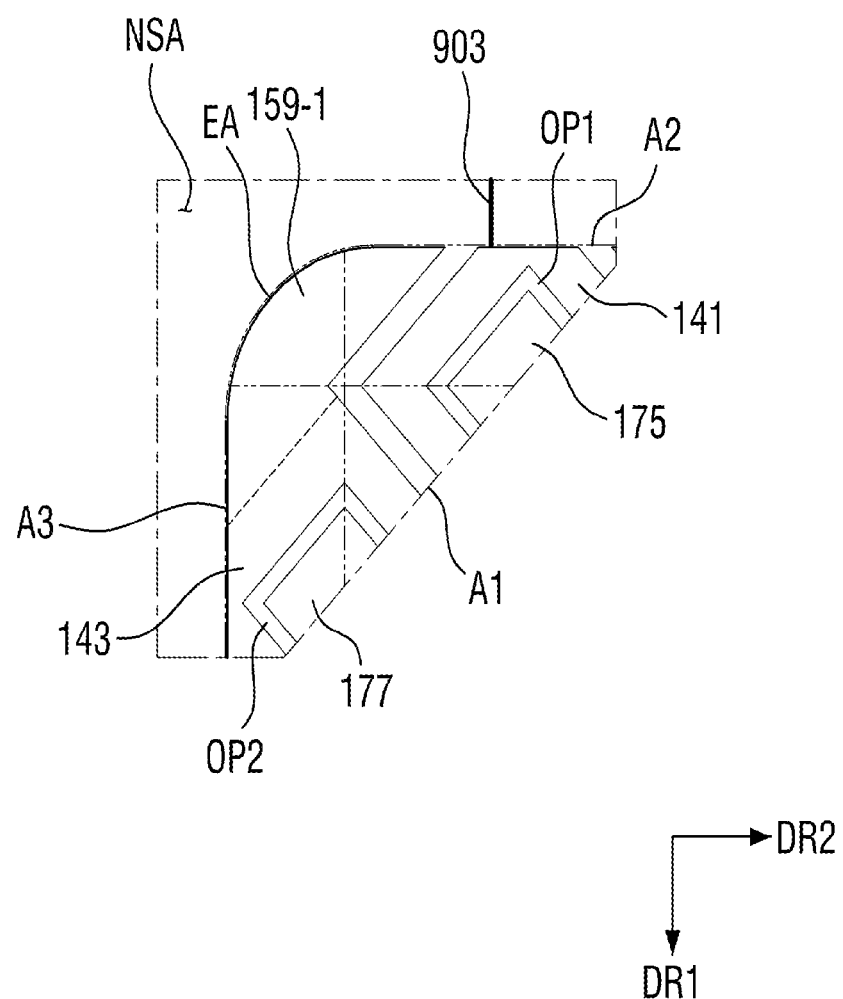
FIG. 22 is a plan view showing a modification of the structure shown in FIG. 21.
Figure 23:
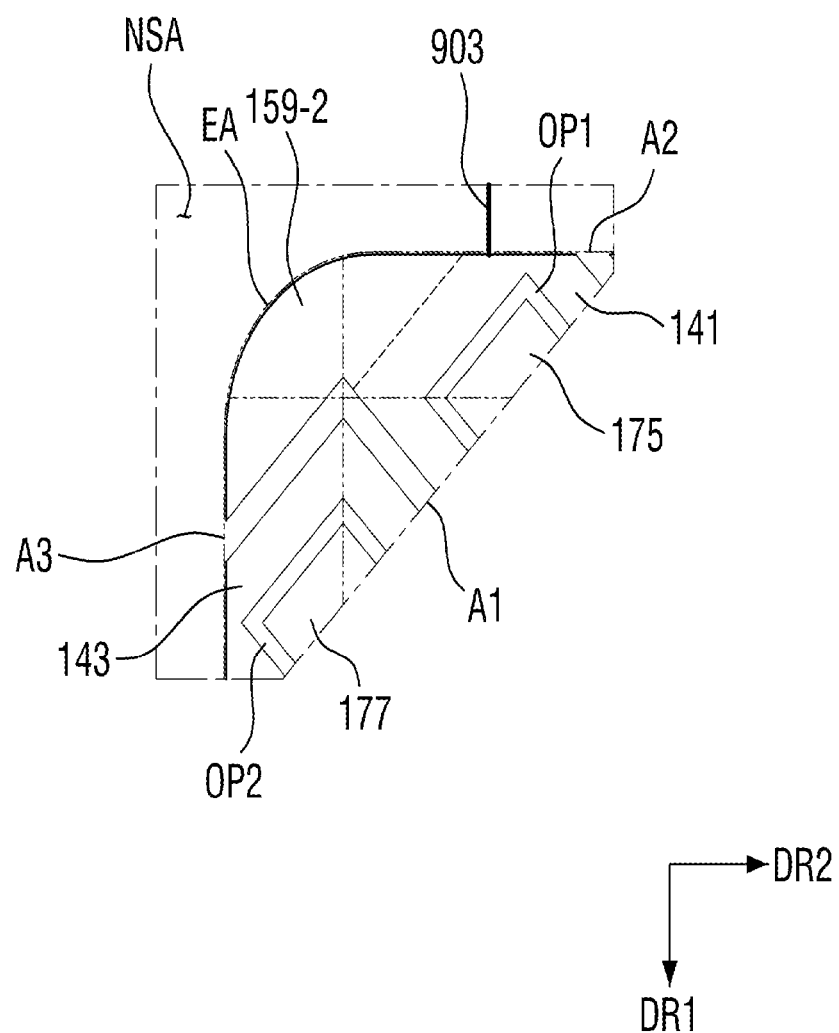
FIG. 23 is a plan view showing another modification of the structure shown in FIG. 21.
Figure 24:
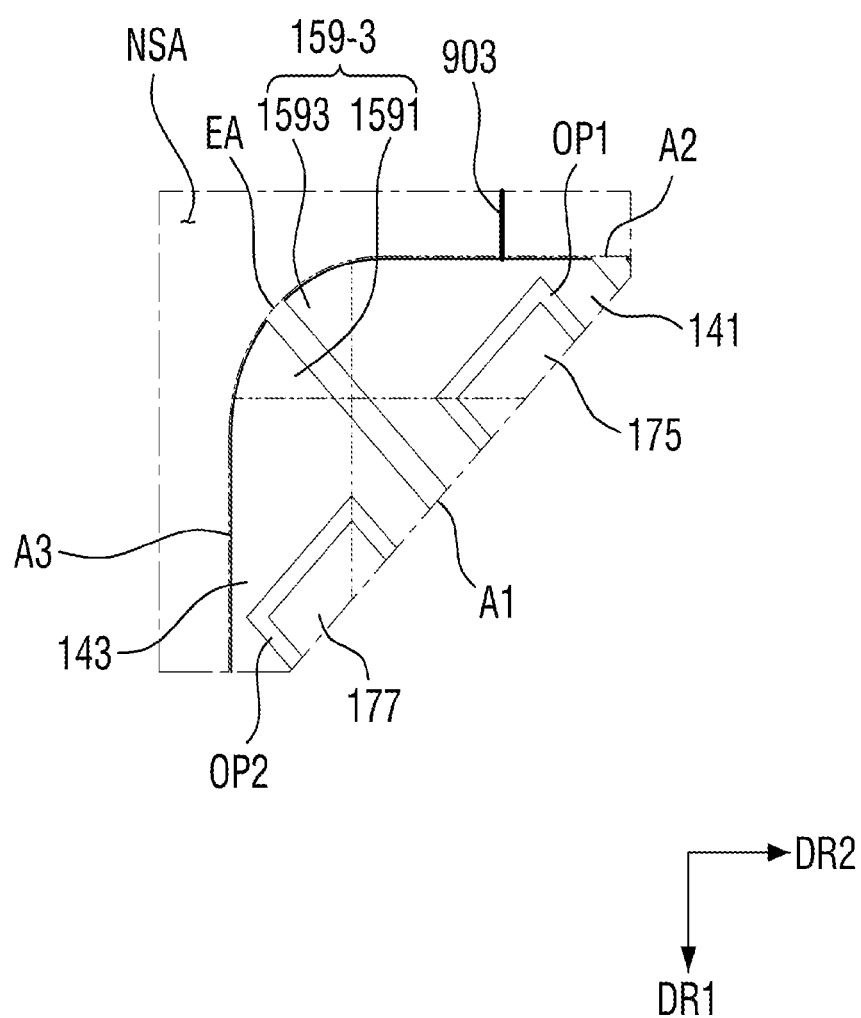
FIG. 24 is a plan view showing yet another modification of the structure shown in FIG. 21.
Figure 25:
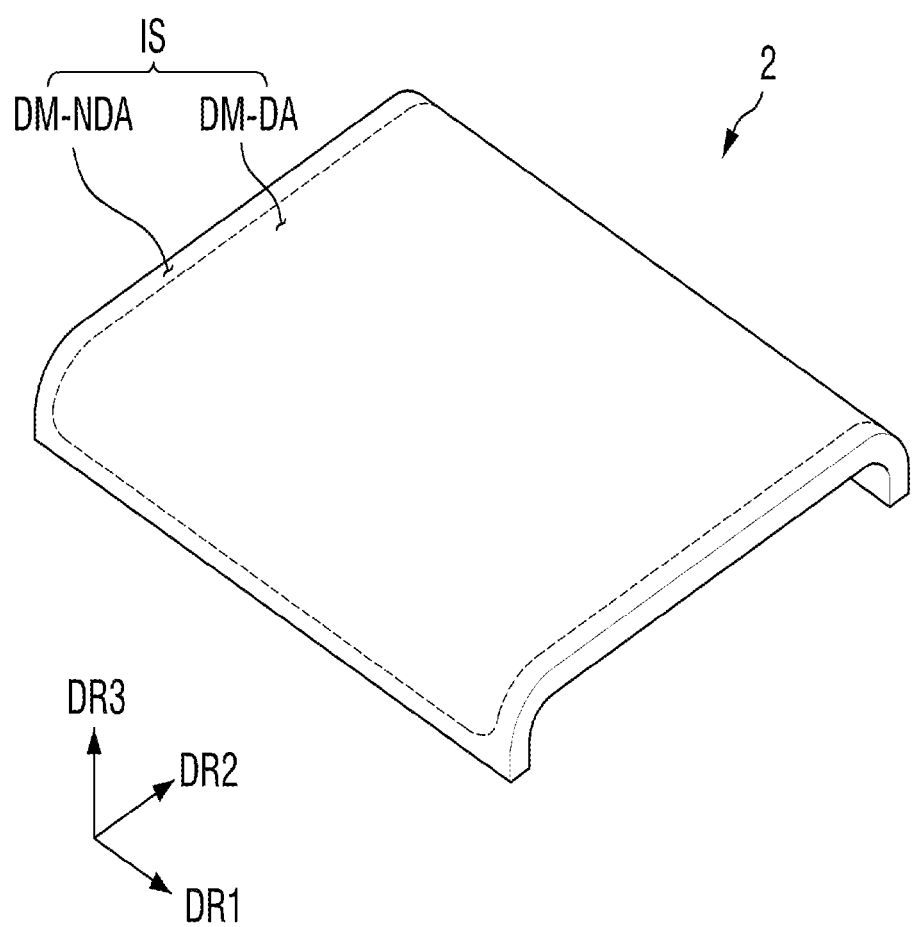
FIG. 25 is a perspective view of a display device according to an exemplary embodiment of the present inventive concept.

FIG. 21 is an enlarged plan view of Q5 portion of FIG. 6. FIG. 22 is a plan view showing a modification of the structure shown in FIG. 21. FIG. 23 is a plan view showing another modification of the structure shown in FIG. 21. FIG. 24 is a plan view showing yet another modification of the structure shown in FIG. 21. FIG. 25 is a perspective view of a display device according to an exemplary embodiment of the present inventive concept.

Hereinafter, an edge area EA will be described with reference to FIGS. 21 to 25.

An edge conductive pattern 159 is located at the edge area EA. In some exemplary embodiments, the edge conductive pattern 159 may include an edge conforming to the edge shape of the sensing area SA. For example, when the edge of the sensing area SA is rounded, a part of the corner of the edge conductive pattern 159 may also be rounded.

In some exemplary embodiments, the edge area EA is located at each of the four corners of the sensing area SA.

In some exemplary embodiments, the edge conductive pattern 159 may be located on the same layer with the first electrode pattern 141 and the second touch electrode 131, may include the same material and may have the same stack structure.

In an exemplary embodiment, the edge conductive pattern 159 is extended into the second area A2 to be spaced apart from the first electrode pattern 141 and is extended into the third area A3 to be spaced apart from the second electrode pattern 143, as shown in FIG. 21.

That is to say, the edge conductive pattern 159 may be a floating pattern. Since the edge conductive pattern 159 is located in the third area A3, it is possible to prevent the space of the edge area EA from being observed from the outside.

It is, however, to be understood that the present disclosure is not limited thereto. The structure of the edge conductive pattern 159 is not limited to that described above but may be altered in a variety of ways.

For example, as shown in FIG. 22, the edge conductive pattern 159-1 is extended toward the second electrode pattern 143 in the third area A3 and is connected to the second electrode pattern 143. Further, similar to the edge conductive pattern 159 of FIG. 21, the edge conductive pattern 159-1 is spaced apart from the first electrode pattern 141. Accordingly, the touch sensitivity in the edge area EA can be improved.

Alternatively, as shown in FIG. 23, the edge conductive pattern 159-2 is extended toward the first electrode pattern 141 in the second area A2 to be connected to the first electrode pattern 141. Further, similar to the edge conductive pattern 159 of FIG. 21, the edge conductive pattern 159-2 is spaced apart from the second electrode pattern 143.

Alternatively, as shown in FIG. 24, the edge conductive pattern 159-3 includes two portions 1591 and 1593 spaced apart from each other. One portion 1591 of the edge conductive pattern 159-3 is connected to the second electrode pattern 143 in the third area A3, and the other portion 1593 of the edge conductive pattern 159-3 is connected to the first electrode pattern 141 in the second area A2.

Besides, the touch sensor TS may be formed in a shape of various combinations. For example, the touch sensor TS may be formed in a combination of one of the structures of the second area A2, one of the structures of the third area A3 and the structures of the edge area EA described above.

In addition, if the touch sensor TS further includes the fourth area A4 and the fifth area A5, in addition to the above-described combinations, the touch sensor TS may be formed in a shape of a combination of one of the structures of the fourth area A4 and one of the structures of the fifth area A5.

According to the above-described exemplary embodiments, a touch sensor with improved touch sensitivity and a display device including the touch sensor can be provided. In particular, the edge of the sensing area of the touch sensor may have improved touch sensitivity.

FIG. 25 is a perspective view of a display device according to an exemplary embodiment of the present inventive concept.

Referring to FIG. 25, a display device 2 according to this exemplary embodiment of the present inventive concept is different from the display device 1 shown in FIG. 1 in that an image surface IS includes a curved surface. For example, as shown in FIG. 25, the display area DM-DA of the image surface IS has a partially bent shape at the edges of the longer sides, and accordingly, a curved surface is formed on one side or both sides of the display area DM-DA. The structure of the display device 2 shown in FIG. 25 may be formed by bending the edges on the longer sides of the structures described above with reference to FIGS. 1 to 24.

In concluding the detailed description of the exemplary embodiments, those skilled in the art will appreciate that many variations and modifications can be made to these embodiments without substantially departing from the principles of the present inventive concept.

What is claimed is:

1. A touch sensor comprising:
a base layer comprising a sensing area and a peripheral area around the sensing area, the sensing area comprising a first area and a second area located on an outer side of the first area in a first direction;
first electrode units comprising a plurality of first touch electrodes arranged on the base layer in the first direction and electrically connected to one another in the first direction, wherein the first electrode units are arranged in a second direction intersecting the first direction and spaced apart from one another in the second direction, and are located in the first area;
second electrode units comprising a plurality of second touch electrodes arranged on the base layer in the second direction and electrically connected to one another in the second direction, wherein the second electrode units are arranged in the first direction and spaced apart from one another in the first direction, and are located in the first area;
a first electrode pattern disposed adjacent the peripheral area on the base layer, wherein the first electrode pattern comprises a first portion located in the first area and electrically connected to one of the first electrode units that is adjacent thereto in the first direction, and a second portion extended from the first portion to the second area, wherein a width of an entirety of the first electrode pattern in the first direction is less than a width of an entirety of each of the first touch electrodes in the first direction and is greater than half the width of the entirety of each of the first touch electrodes; and
a conductive pattern which is floated and disposed between the first electrode pattern and an electrode pattern that is adjacent the peripheral area and spaced apart from the first electrode pattern,
wherein the conductive pattern is disposed adjacent the first electrode pattern and the electrode pattern, and
wherein a side of the conductive pattern disposed along an edge of the peripheral area is disposed adjacent a first side of the first electrode pattern disposed along the edge of the peripheral area,
wherein the first electrode pattern includes second and third diagonal sides arranged in directions crossing one another, the first side is connected to the second diagonal side, and the second diagonal side is adjacent the peripheral area and connected to the third diagonal side,
wherein the touch sensor further comprises an edge conductive pattern disposed in the sensing area,
wherein the sensing area further comprises a corner area disposed at a corner of the sensing area,
wherein the corner area is different from the first area and the second area, and
wherein the edge conductive pattern includes a rounded edge disposed along the edge of the peripheral area.

2. The touch sensor of claim 1, wherein a width of the second portion measured in the first direction is less than half the width of the entirety of each first touch electrode in the first direction.

3. The touch sensor of claim 2, wherein a width of the first portion in the first direction is substantially equal to half the width of the entirety of each of the first touch electrodes in the first direction.

4. The touch sensor of claim 2, wherein a width of the second area in the first direction is substantially equal to the width of the second portion in the first direction.

5. The touch sensor of claim 1, wherein the first touch electrodes, the second touch electrodes and the first electrode pattern are located on a same layer, and wherein the first electrode pattern, the first touch electrodes and the second touch electrodes comprise a same material.

6. The touch sensor of claim 5, wherein each of the first electrode units further comprises a first connecting part connecting two of the first touch electrodes adjacent to each other in the first direction, and a second connecting part connected to the first electrode pattern, wherein each of the second electrode units further comprises a third connecting part connecting two of the second touch electrodes adjacent to each other in the second direction, the third connecting part insulated from the first connecting part, wherein one of the first connecting part and the third connecting part is located on a same layer with the first touch electrodes, the second touch electrodes and the first electrode pattern, wherein the other one of the first connecting part and the third connecting part is located on a layer different from a layer where the first touch electrodes, the second touch electrodes and the first electrode pattern are disposed, and wherein the first connecting part and the second connecting part are located on a same layer.

7. The touch sensor of claim 6, further comprising:
an insulating layer disposed on the base layer, wherein the first connecting part and the second connecting part are disposed on the base layer, wherein the insulating layer is disposed on the first connecting part and the second connecting part, and wherein the first touch electrodes, the second touch electrodes, the first electrode pattern and the third connecting parts are disposed on the insulating layer.

8. The touch sensor of claim 1, wherein each of the first touch electrodes comprises a first opening, wherein the first electrode pattern comprises a second opening, wherein the touch sensor further comprises:
a dummy pattern located in the first opening and spaced apart from the first touch electrodes; and
an electrode dummy pattern located in the second opening and spaced apart from the first electrode pattern, and wherein the electrode dummy pattern, the dummy pattern, the first touch electrodes and the first electrode pattern are located on a same layer.

9. The touch sensor of claim 8, wherein the first electrode pattern, the first touch electrodes, the electrode dummy pattern and the dummy pattern comprise a same material.

10. The touch sensor of claim 1, wherein the first electrode pattern comprises lines spaced apart from one another in the second direction.

11. The touch sensor of claim 10, further comprising:
the conductive pattern disposed on the base layer, the conductive pattern being located in the second area and spaced apart from the first electrode pattern,
wherein the first touch electrodes, the second touch electrodes, the first electrode pattern and the conductive pattern are disposed on a same layer.

12. The touch sensor of claim 1, further comprising:
a signal line disposed on the base layer in the peripheral area and connected to the first electrode pattern, wherein the signal line comprises a same material as the first electrode pattern.

13. The touch sensor of claim 1, wherein the sensing area further comprises a third area located on the outer side of the first area in the second direction, wherein touch sensor further comprises:
a second electrode pattern disposed on the base layer in the first area, wherein the second electrode pattern comprises a third portion electrically connected to one of the second electrode units that is adjacent thereto in the second direction, and a fourth portion extended from the third portion to the third area,
wherein a width of the second electrode pattern in the second direction is less than a width of each of the second touch electrodes in the second direction and is greater than half the width of each of the second touch electrodes, and a width of the fourth portion in the second direction is less than half the width of the second touch electrodes in the second direction.

14. The touch sensor of claim 13, wherein a width of the third area in the second direction is substantially equal to a width of the fourth portion in the second direction.

15. The touch sensor of claim 13, wherein the first touch electrodes, the second touch electrodes, the first electrode pattern and the second electrode pattern are located on a same layer and comprise a same material.

16. The touch sensor of claim 13, further comprising:
a second conductive pattern disposed on the base layer, the second conductive pattern being located in the third area and spaced apart from the second electrode pattern, wherein the first touch electrodes, the second touch electrodes, the first electrode pattern and the second conductive pattern are disposed on a same layer.

17. A display device comprising:
a base substrate comprising a display area;
a self-luminous element disposed on the base substrate in the display area;
a thin-film encapsulation layer disposed on the self-luminous element and comprising a sensing area overlapping with the display area and a peripheral area around the sensing area, the sensing area comprising a first area and a second area located on the outer side of the first area in a first direction;
first electrode units comprising first touch electrodes arranged on the thin-film encapsulation layer in the first direction and electrically connected to one another in the first direction, the first electrode units being arranged in a second direction intersecting the first direction in the first area and spaced apart from one another in the second direction;
second electrode units comprising second touch electrodes arranged on the thin- film encapsulation layer in the second direction and electrically connected to one another in the second direction, the second electrode units being arranged in the first direction in the first area and spaced apart from one another in the first direction;
a first electrode pattern located on the thin-film encapsulation layer and comprising a first portion electrically connected to one of the first electrode units that is adjacent thereto in the first direction, and a second portion extended from the first portion to the second area, wherein a width of an entirety of each of the first electrode pattern in the first direction is less than a width of an entirety of each of the first touch electrodes in the first direction and is greater than half the width of the entirety of the first touch electrodes; and
a conductive pattern which is floated and disposed adjacent the first electrode pattern and adjacent one of the second touch electrodes,
wherein a side of the conductive pattern disposed along an outer edge of the second area is disposed adjacent a first side of the first electrode pattern disposed along the outer edge of the second area,
wherein the first electrode pattern includes a second diagonal side located adjacent a periphery of the sensing area in the first area and a third diagonal side located in the second area having a length different from the second diagonal side, and the diagonal sides are arranged in directions crossing one another,
wherein the display device further comprises an edge conductive pattern disposed in the sensing area,
wherein the sensing area further comprises a corner area disposed at a corner of the sensing area,
wherein the corner area is different from the first area and the second area, and
wherein the edge conductive pattern includes a rounded edge disposed along the edge of the peripheral area.

18. The display device of claim 17, wherein the thin-film encapsulation layer comprises a first inorganic encapsulation layer disposed on the self-luminous element, an organic encapsulation layer disposed on the first encapsulation inorganic layer, and a second inorganic encapsulation layer disposed on the organic encapsulation layer.

19. The display device of claim 17, wherein a width of the second portion measured along the first direction is less than half the width of the entirety of the first touch electrodes in the first direction, and wherein a width of the second area in the first direction is substantially equal to a width of the second portion in the first direction.

20. The display device of claim 17, wherein the first electrode pattern has a pentagon shape and the first touch electrodes have a diamond shape.

21. The display device of claim 17, where a number of edges of the first electrode pattern is greater than a number of edges of the first touch electrode.

* * * * *